United States Patent [19]

Fick et al.

[11] 4,442,665
[45] Apr. 17, 1984

[54] COAL GASIFICATION POWER GENERATION PLANT

[75] Inventors: Bruce R. Fick, Ballston Lake; Robert M. Jones, Scotia, both of N.Y.

[73] Assignee: General Electric Company, Schenectady, N.Y.

[21] Appl. No.: 198,059

[22] Filed: Oct. 17, 1980

[51] Int. Cl.³ .............................................. F02C 3/28
[52] U.S. Cl. ................................. 60/39.12; 60/39.182; 60/39.463; 48/191
[58] Field of Search ......... 60/39.12, 39.18 B, 39.46 P; 48/87, 191

[56] References Cited

U.S. PATENT DOCUMENTS

| | | | |
|---|---|---|---|
| 1,267,443 | 5/1918 | Newell | 48/87 |
| 1,425,875 | 8/1922 | Lummis | 48/87 |
| 2,496,407 | 2/1950 | Pfenninger | 60/39.12 |
| 3,577,877 | 5/1971 | Warne | 60/39.28 R |
| 3,766,734 | 10/1973 | Jones | 60/39.28 R |
| 3,875,380 | 4/1975 | Rankin | 60/39.46 P |
| 3,990,229 | 11/1976 | Staege | 60/39.12 |
| 4,058,974 | 11/1977 | Pfenninger | 60/39.12 |
| 4,168,608 | 9/1979 | Uram | 60/39.03 |
| 4,231,761 | 11/1980 | Meyer-Kahrweg | 60/39.12 |

FOREIGN PATENT DOCUMENTS

| | | |
|---|---|---|
| 1494615 | 7/1977 | United Kingdom . |
| 1493604 | 11/1977 | United Kingdom . |
| 1495274 | 12/1977 | United Kingdom . |

Primary Examiner—Louis J. Casaregola
Attorney, Agent, or Firm—J. C. Squillaro

[57] ABSTRACT

A combined cycle coal gasification power plant includes a coal gasifier which generates low BTU coal gas for consumption by a gas turbine. Before being applied to the gas turbine, the coal gas is passed through a clean-up system which removes undesirable constituents from the coal gas. Efficient operation of the clean-up system requires that a predetermined discharge pressure of clean coal gas leaving the clean-up system must be maintained. A control system controls the coal gasifier according to either one of the discharge pressure of clean coal gas and the turbine power output requirement while maintaining the clean coal gas discharge pressure and power output at predetermined values.

31 Claims, 15 Drawing Figures

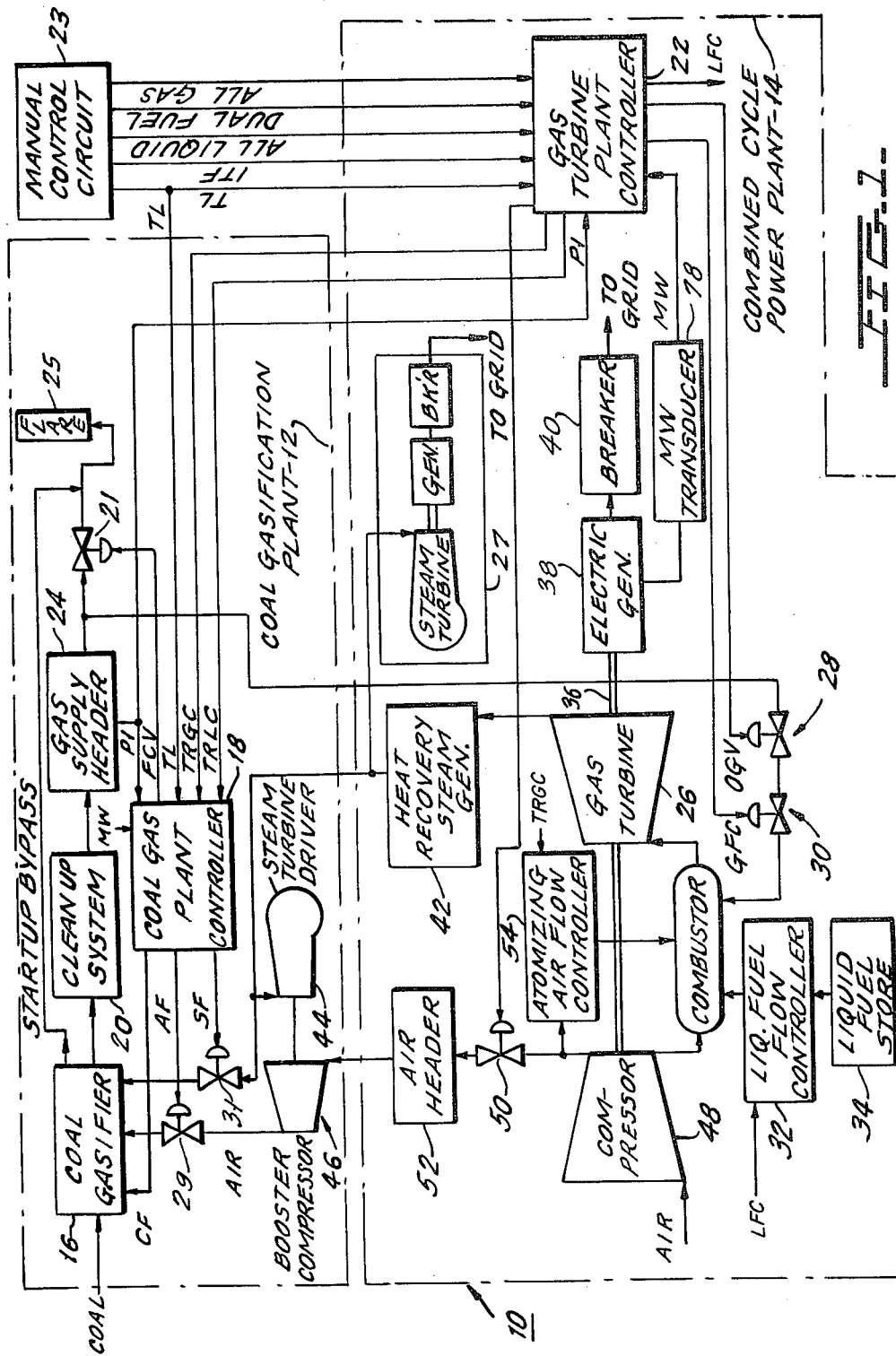

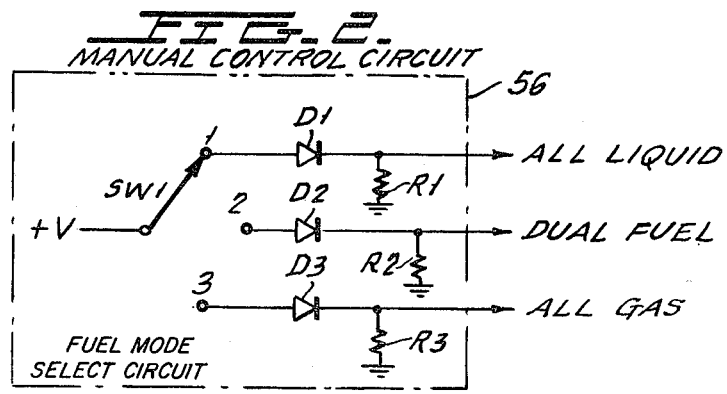
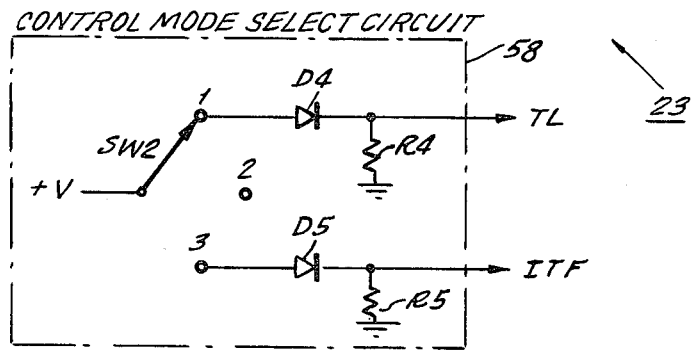
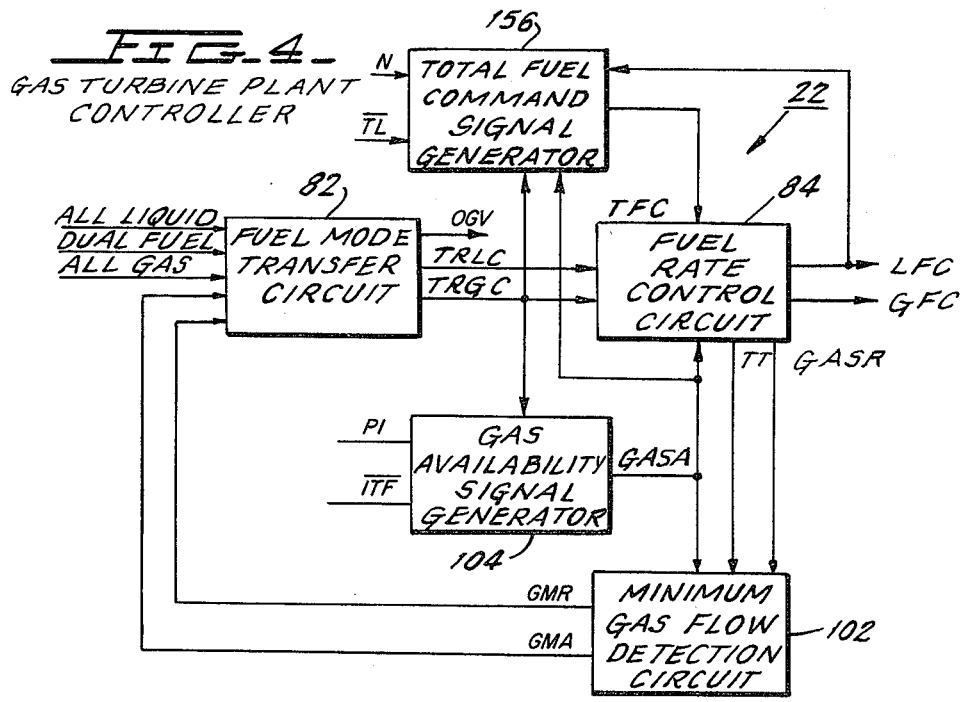

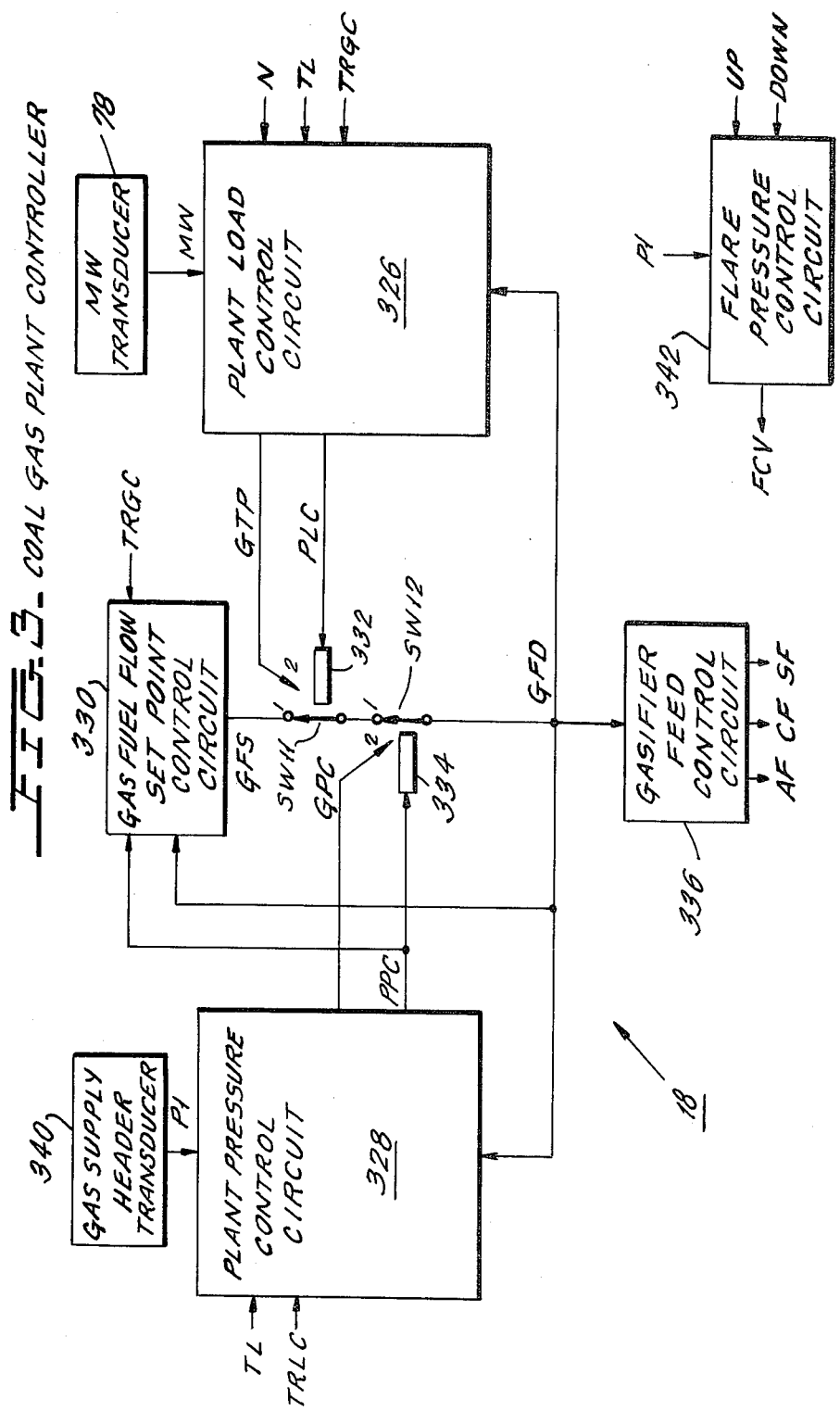

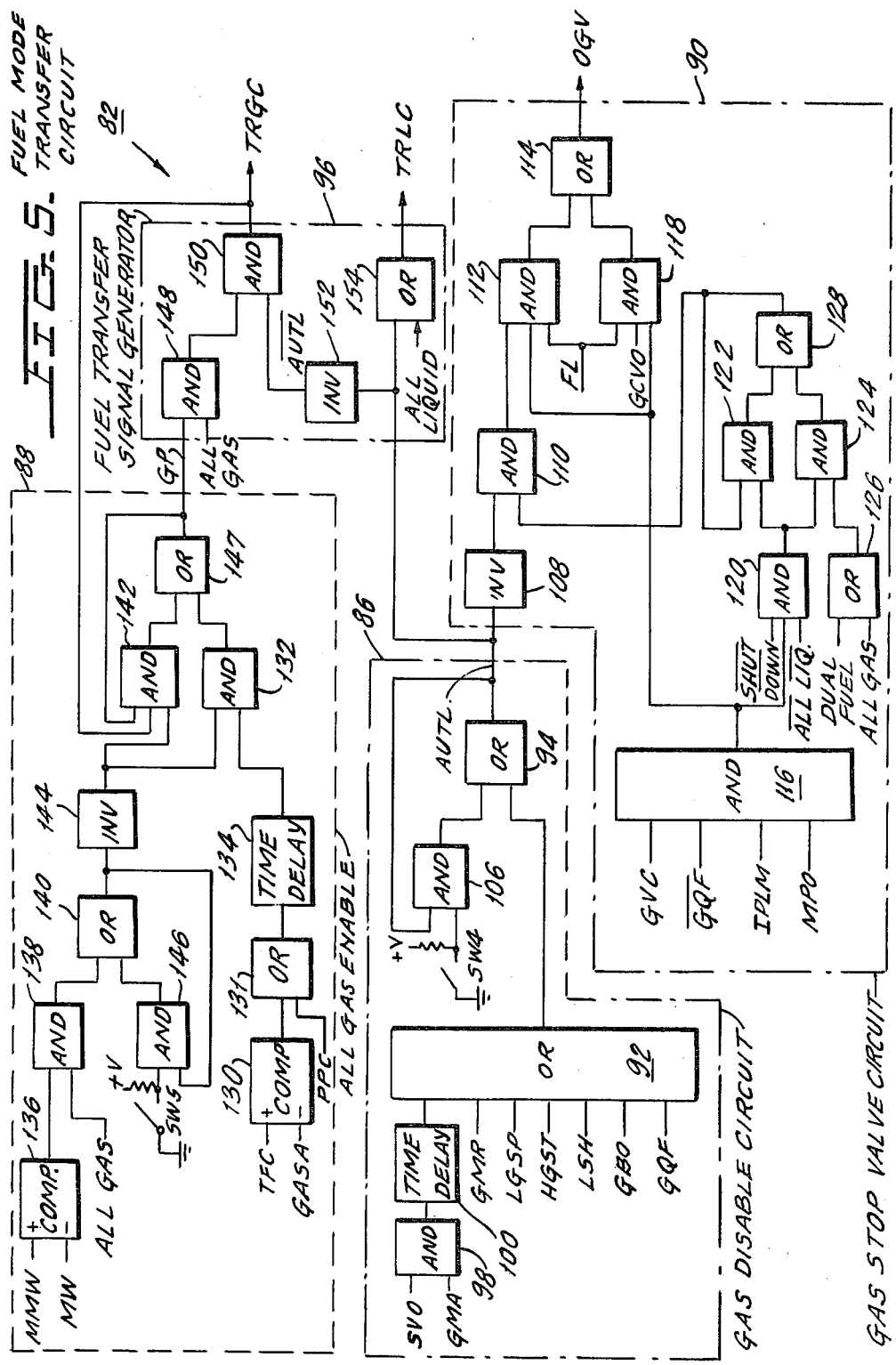

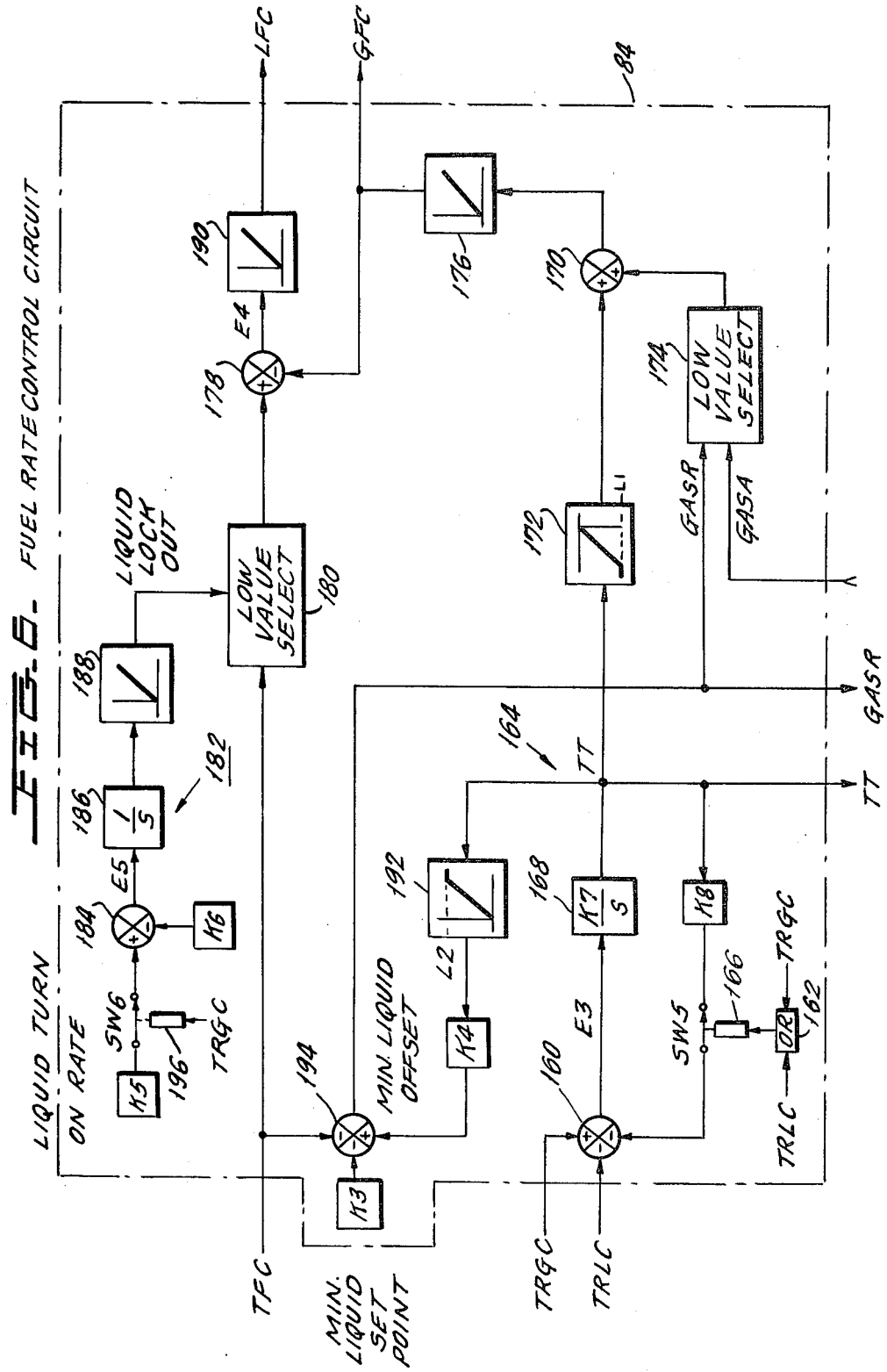

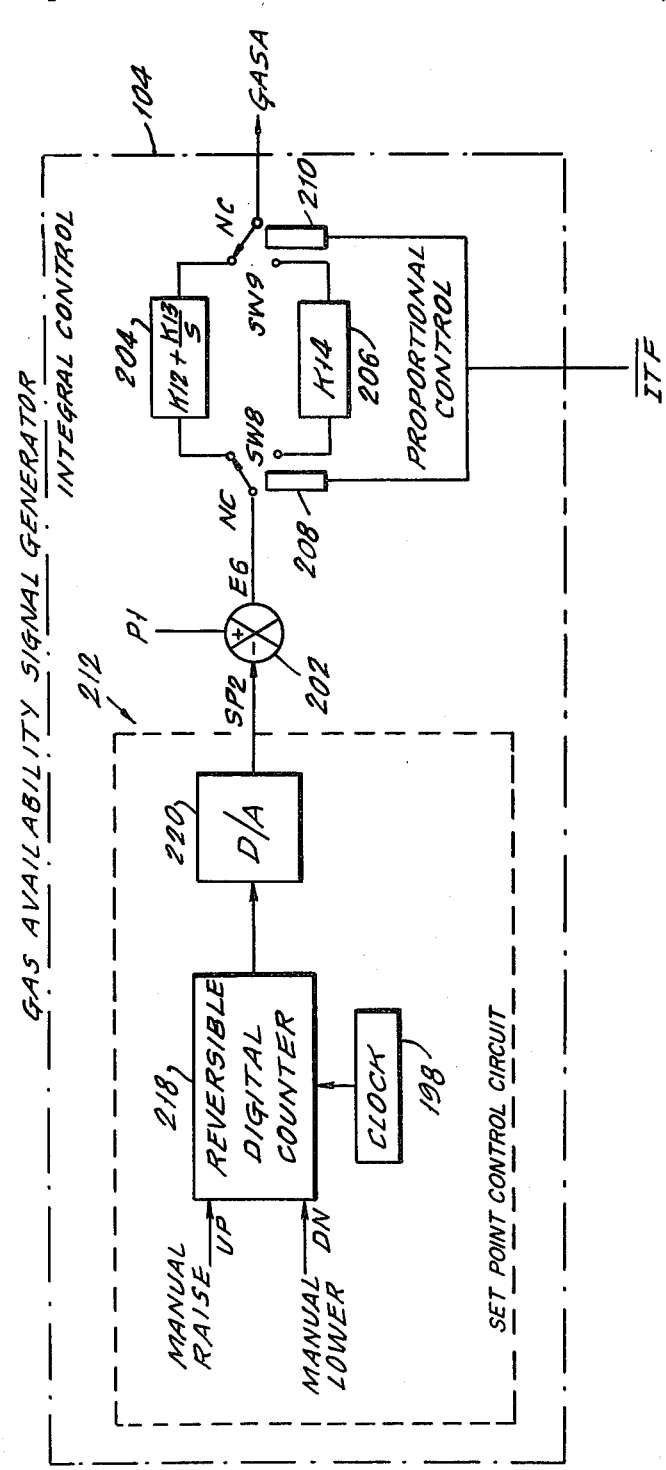

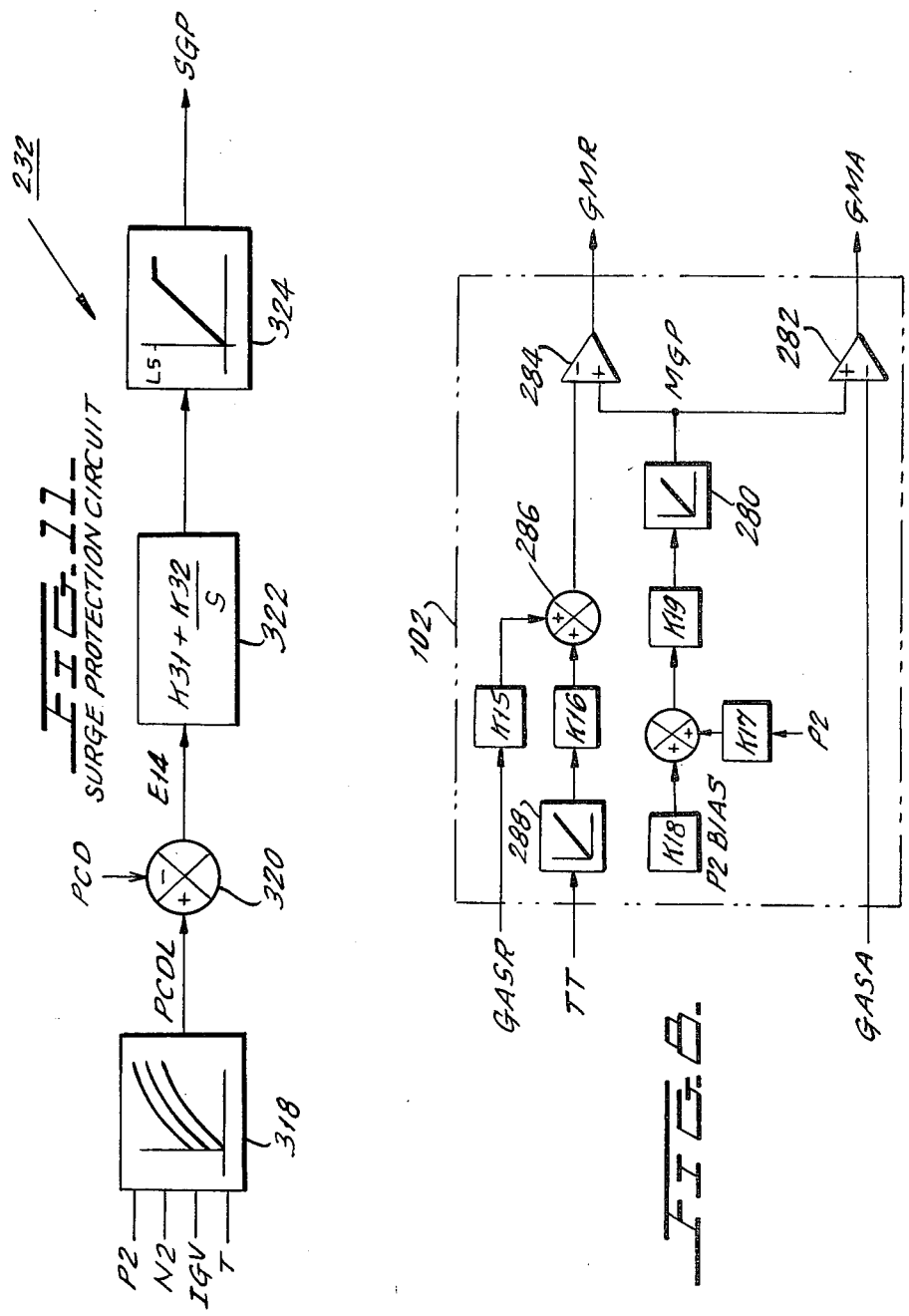

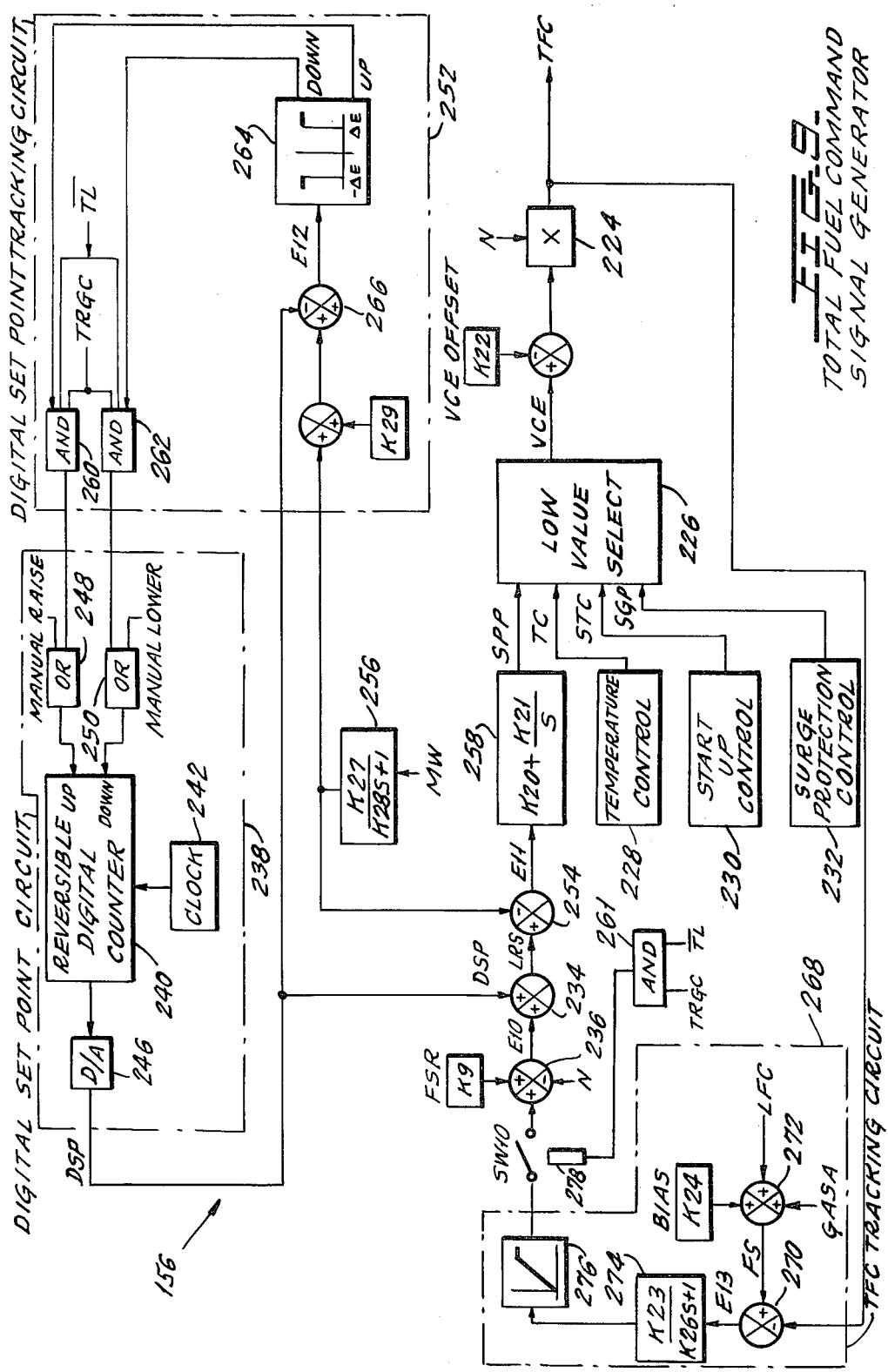

DUAL FUEL SYSTEM

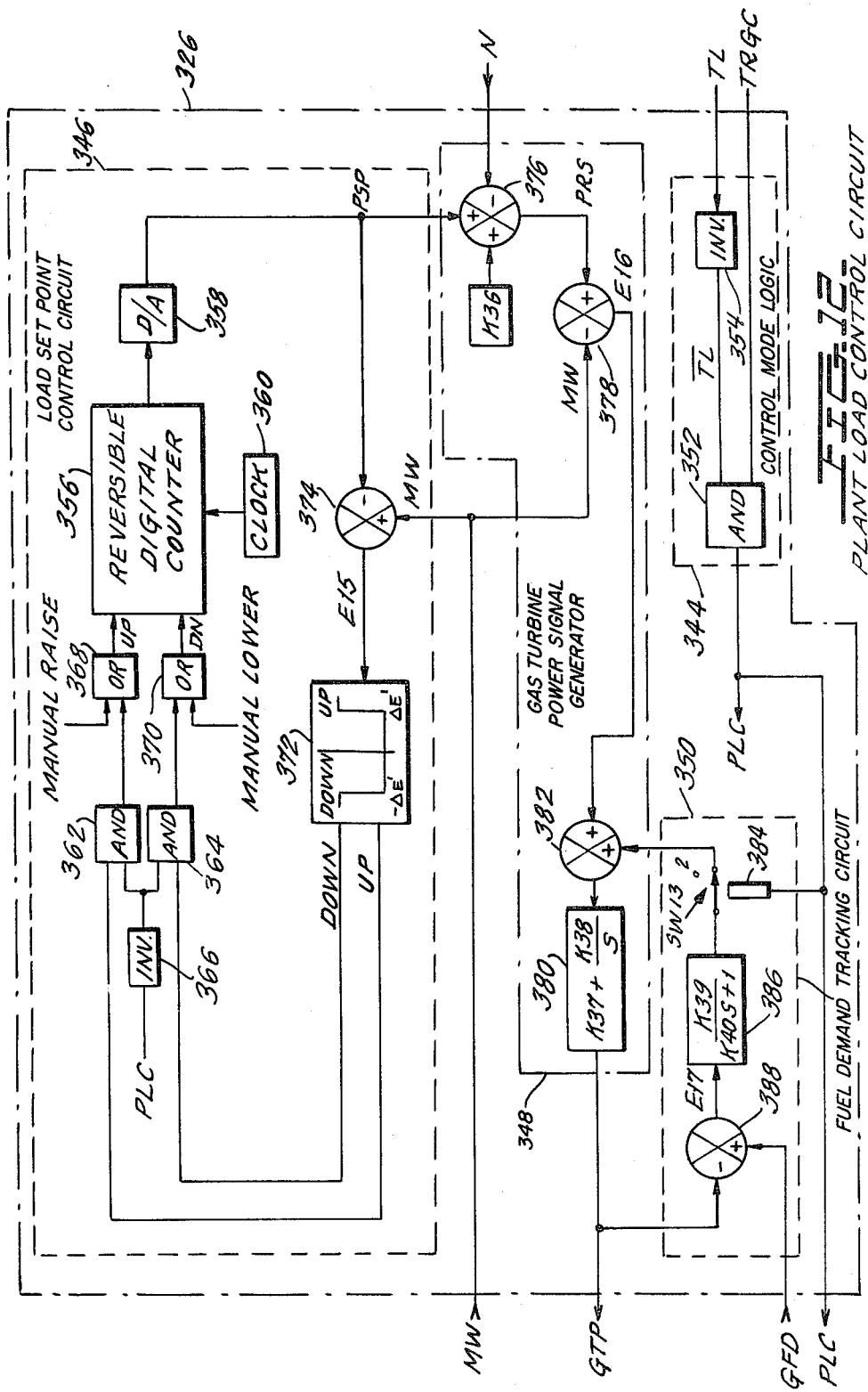

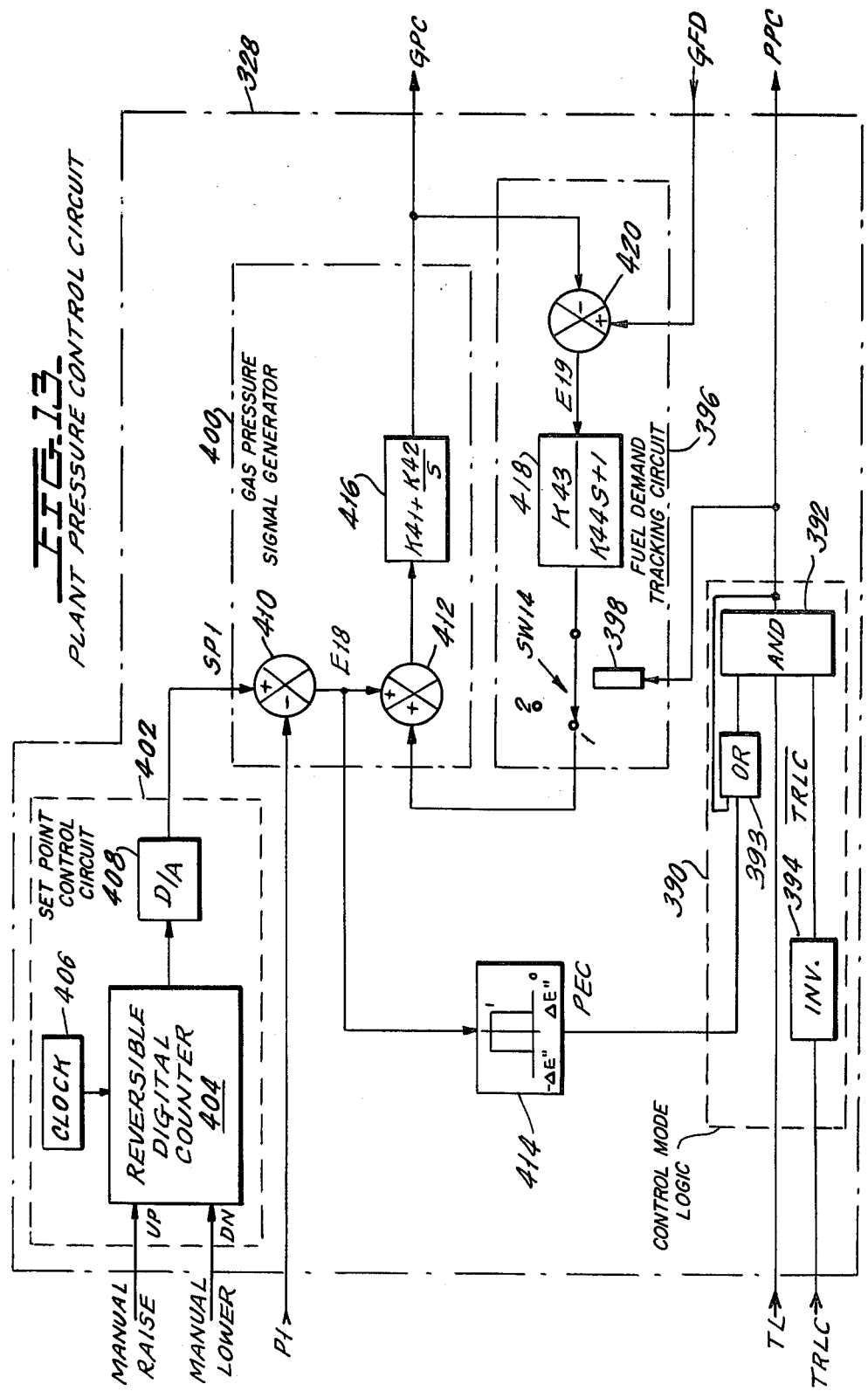

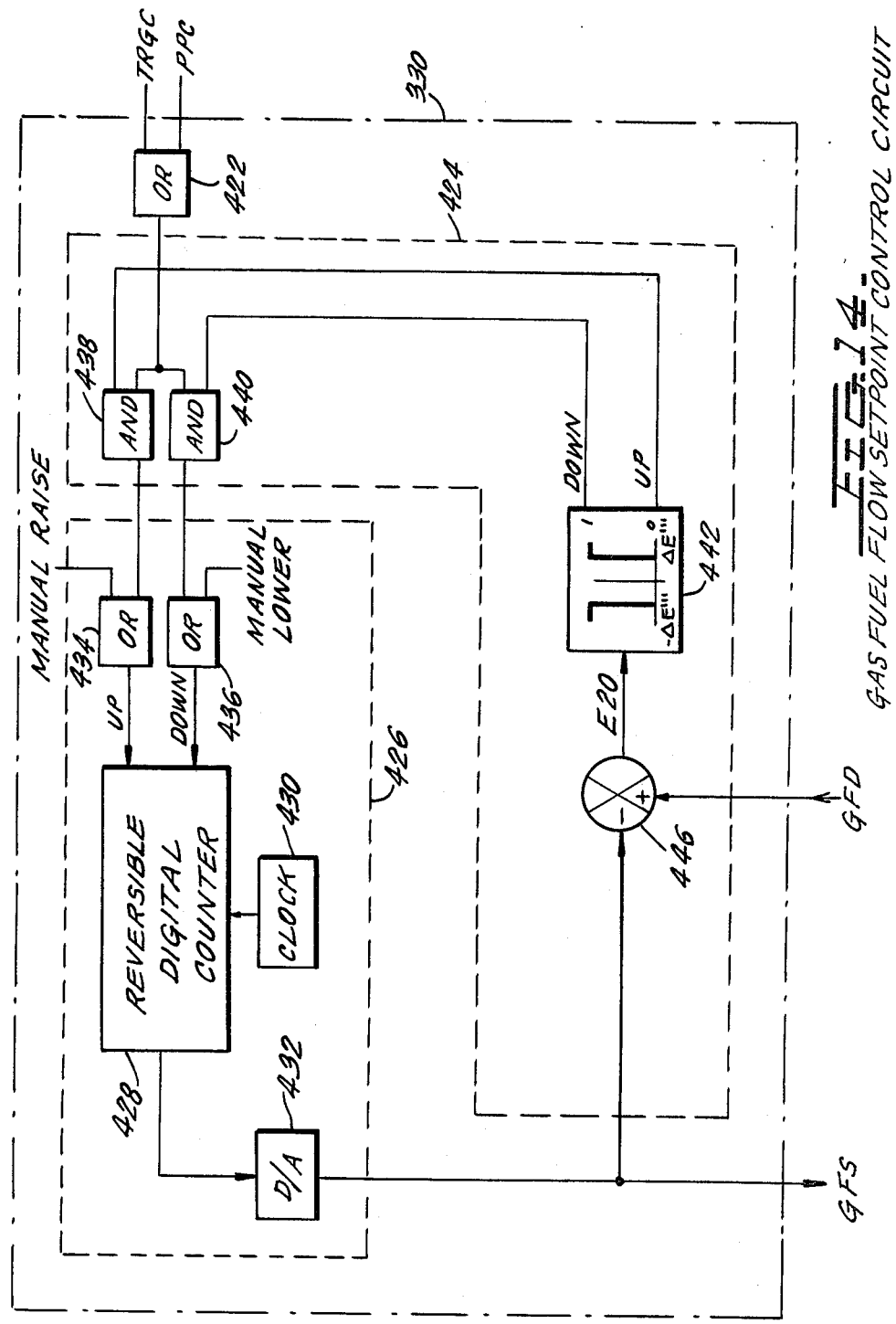

PLANT FLARE PRESSURE CONTROL CIRCUIT

COAL GASIFICATION POWER GENERATION PLANT

TABLE OF CONTENTS

I. BACKGROUND OF THE INVENTION
II. BRIEF SUMMARY OF THE INVENTION
III. BRIEF DESCRIPTION OF THE DRAWINGS
IV. DETAILED DESCRIPTION OF THE INVENTION
   A. Overall System Description
   B. Manual Control Circuit
   C. Gas Turbine Plant Controller
      (1) Fuel Mode Transfer Circuit
      (2) Fuel Rate Control Circuit
      (3) Gas Availability Signal Generator
         (a) Integral Turbine Follow Mode Operation
         (b) Turbine Follow Mode Operation
         (c) Turbine Lead Mode Operation
      (4) Total Fuel Command Signal Generator
      (5) Minimum Gas Flow Detection Circuit
      (6) Surge Protection Circuit
      (7) Dual Fuel Dispensing System
   D. Coal Gas Plant Controller
      (1) Introduction
      (2) Plant Load Control Circuit
      (3) Plant Pressure Control Circuit
      (4) Gas Fuel Set Point Control Circuit
      (5) Flare Pressure Control Circuit
   E. Summary of Operation
      (1) Turbine Lead Mode of Operation
      (2) Turbine Follow Mode of Operation
V. CLAIMS

I. BACKGROUND OF THE INVENTION

The present invention is directed towards a power generation plant and, more particularly, towards a power generation plant which converts coal gas to a useful power output.

Several recent studies have demonstrated the desirability of combining the efficiency of combined cycle power generation with coal utilization through the production of coal gas. See, for example, Sheldon et al., *Economics of Power Generation from Coal Gasification for Combined Cycle Power Plants,* American Power Congress, Apr. 21-23, 1975. In such systems, low BTU coal gas is generated by a coal gasifier and is converted by one or more gas turbines into a useful power output. The mechanical output of the gas turbines is typically converted into an electrical output and applied to the power grid of an electric utility.

Before the coal gas is applied to the gas turbine, undesirable constituents must be removed therefrom for both environmental reasons and to protect the integrity of the gas turbine. To this end, a cleanup system is interposed between the coal gasification plant and the gas turbines. Proper operation of the cleanup system requires that the discharge pressure of the gas leaving the cleanup system must be maintained at nearly a constant level and that rates of pressure change are also limited to an acceptable level.

The power output of the turbines must also be maintained at levels consistent with load demands. This is often difficult due to variations in the gas heating value and gas availability. Additionally, this requirement is often in conflict with the requirement that the discharge pressure of the cleanup system be maintained constant since a change in the flow of coal gas from the cleanup system to the gas turbine may result in a corresponding change in the discharge pressure of the clean-up system.

II. BRIEF SUMMARY OF THE INVENTION

In accordance with the foregoing requirements, the present invention is directed towards a power plant including:

a coal gasification plant including a coal gasifier and a cleanup system for removing undesirable constituents from coal gas produced by the gasifier, the operation of the cleanup system varying as a function of the discharge pressure of clean coal gas leaving the cleanup system;

a gas turbine capable of converting the clean coal gas into a power output, the power output of the turbine varying as a function of flow of clean coal gas thereto; and a control system for adjusting the flow of coal gas from the gasifier to the cleanup system and from the cleanup system to the gas turbine in such a manner that the power output of the gas turbine is maintained at levels consistent with the load demand of the power plant and that the discharge pressure of the cleanup system remain substantially constant.

In the preferred embodiment, the power plant is capable of operating in an all liquid mode, a dual fuel mode and an all gas fuel mode of operation. The operator of the plant is free to select the desired fuel mode of operation. When operating in the all gas mode, however, the control system automatically transfers operation from the all gas fuel mode to either the dual fuel or all liquid modes whenever gas quality or quantity falls below required levels as a protective measure in order to ensure continuous operation of the gas turbine.

In the all liquid mode of operation, the control system applies only liquid fuel to the turbine. This mode of operation is used primarily during startup conditions and when gas quality or quantity falls below predetermined minimums.

In the dual fuel mode, the control system applies both liquid fuel and coal gas to the gas turbine. In this mode, the flow of coal gas to the turbine is varied in a manner which causes the output pressure of the cleanup system to remain constant. In order to offset any changes in the flow of coal gas to the turbine, the control circuit varies the liquid fuel flow to the turbine to maintain power output at the desired load level.

In the all gas mode of operation, the control system applies only coal gas to the gas turbine. In order to maintain the power output of the turbine at the desired load level and to maintain the discharge pressure of the cleanup system constant, the control system varies both the gas fuel production rate of the coal gasifier and the gas fuel consumption rate of the gas turbine in a manner which attempts to meet both conditions. This result is achieved in either a turbine lead or a turbine follow mode of operation. In the turbine lead mode of operation, gas fuel consumption by the gas turbine is varied to alter the power output of the gas turbine to meet the load demand and gas production by the coal gasifier is varied to offset pressure changes in the discharge pressure of the cleanup system, resulting from changes in the rate of gas consumption by the gas turbine. In the turbine follow mode of operation, the gas fuel consumption of the turbine is varied in a manner which maintains the output pressure of the cleanup system constant while the gas production of the coal gasifier is varied in a manner to produce the desired power output of the turbine constant.

In the preferred embodiment of the present invention, the mechanical power output of the gas turbine is converted to an electrical power output by an electrical generator. The electrical generator, in turn, supplies electrical energy to the power grid of an electric utility. In such an application, one of the primary functions of the gas turbine is to maintain the grid frequency at a predetermined level (normally 60 cycles). To this end, the control system of the present invention continually monitors the frequency of the power grid and responds to changes therein by either increasing or decreasing the power output of the turbine as required to maintain the utility frequency approximately constant.

It is often desirable to feed a plurality of gas turbines from a single coal gasification plant. In such a case, the control system of the present invention maintains the power output of each of the turbines at a respective desired level while at the same time maintaining the pressure output of the gas cleanup system constant. The pressure invention also makes it possible to distribute the load among the individual gas turbines as desired.

III. BRIEF DESCRIPTION OF THE DRAWINGS

For the purpose of illustrating the invention, there is shown in the drawings an embodiment which is presently preferred; it being understood, however, that the invention is not limited to the precise arrangements and instrumentalities shown.

FIG. 1 is a block diagram of a power plant constructed in accordance with the principles of the present invention.

FIG. 2 is a circuit diagram of the manual control circuit of FIG. 1.

FIG. 3 is a block diagram of the coal gas plant controller of FIG. 1.

FIG. 4 is a block diagram of the gas turbine plant controller of FIG. 1.

FIG. 5 is a block diagram of the fuel mode transfer circuit of FIG. 4.

FIG. 6 is a block diagram of the fuel rate control circuit of FIG. 4.

FIG. 7 is a block diagram of the gas availability signal generator of FIG. 4.

FIG. 8 is a block diagram of the minimum gas load detection circuit of FIG. 4.

FIG. 9 is a block diagram of the total fuel command signal generator of FIG. 4.

FIG. 11 is a block diagram of the surge protection circuit of FIG. 9.

FIG. 12 is a block diagram of the plant load control circuit of FIG. 3.

FIG. 13 is a block diagram of the plant pressure control circuit of FIG. 3.

FIG. 14 is a block diagram of the gas fuel flow set point control circuit of FIG. 3.

IV. DETAILED DESCRIPTION OF THE INVENTION

A. Overall System Description

Figure 10:
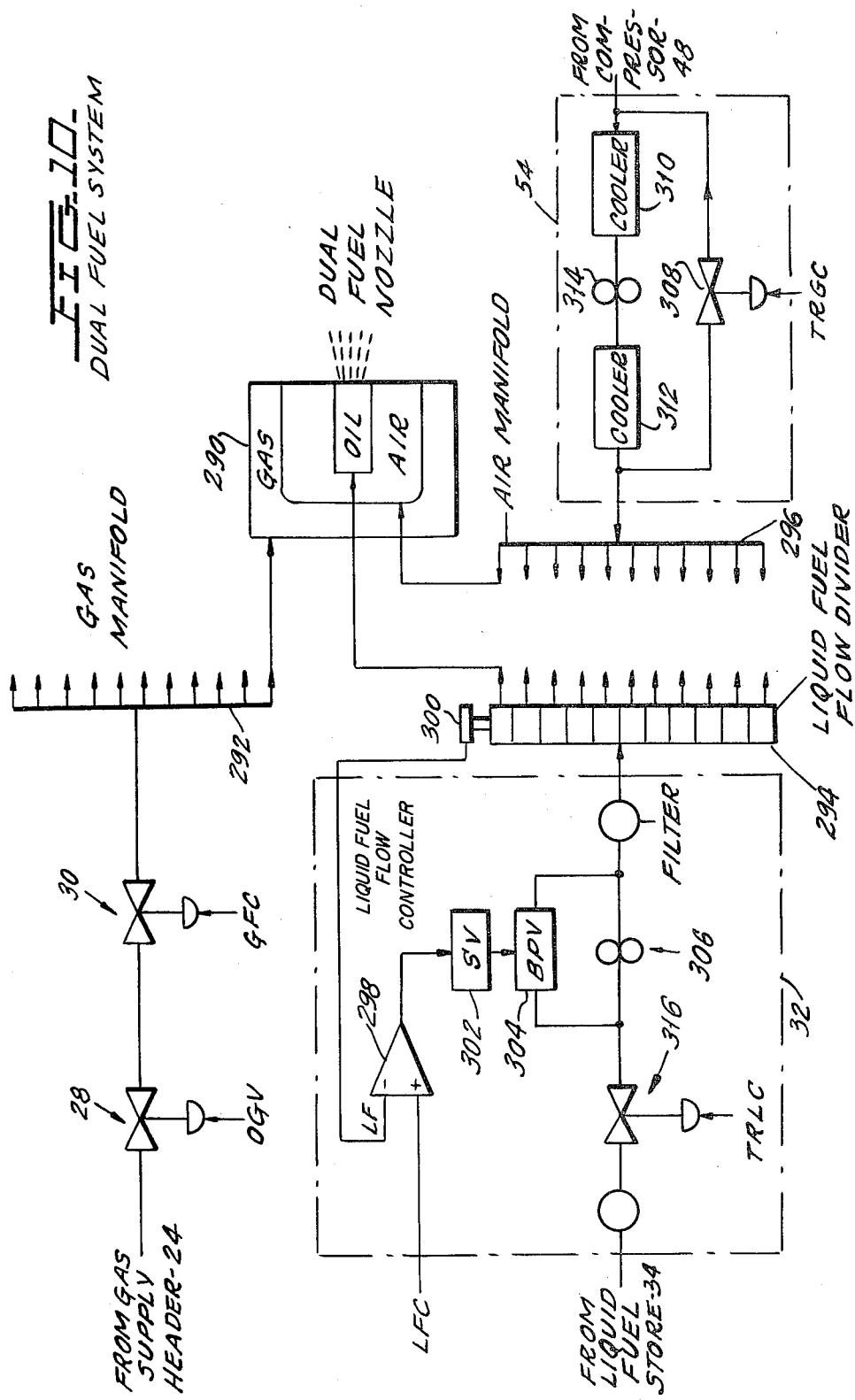
FIG. 10 illustrates the dual fuel distribution system used in the gas turbine of FIG. 1.

Referring now to the drawings, wherein like numerals indicate like elements, there is shown in FIG. 1 a block diagram of a dual fuel power plant constructed in accordance with the principles of the present invention and designated generally as 10. Dual fuel power plant 10 includes a coal gasification plant 12 and a combined cycle power plant 14. The primary function of coal gasification plant 12 is to produce synthetic coal gas for consumption by the combined cycle power plant 14. The primary function of combined cycle power plant 14 is to convert the coal gas generated by coal gasification plant 12 into a useful power output (an electrical power output in the embodiment illustrated). As a by-product of this process, combined cycle power plant 14 generates compressed air and steam which are used by coal gasification plant 12 in the generation of coal gas.

The primary components of coal gasification plant 12 are a coal gasifier 16 and a clean-up system 20. Coal gasifier 16 may be a "fixed bed" Lurgi type gasifier. A description of one such gasifier is found in Baughman, *Synthetic Fuels Data Handbook,* 2nd Ed., pp. 219-223. Gasifiers of this type generate a low BTU coal gas as the result of a chemical reaction between oxygen, steam, and coal residing in the gasifier. The quantity of gas produced by coal gasifier 16 is determined by the rate at which compressed air and steam are fed into coal gasifier 16. As will be described in greater detail below, the air and steam flow rates into coal gasifier 16, and therefore the gas production rate of coal gasifier 16, are controlled by a coal gas plant controller 18 by adjusting the position of valves 29 and 31. Coal gas plant controller 18 controls gas production in a manner which is consistent with both the power output requirements of combined cycle power plant 14 and with the satisfactory operation of clean-up system 20. This action is described in some detail below.

Clean-up system 20 receives the gas generated by coal gasifier 16 and removes undesirable gas constituents (such as sulfur) therefrom. While any appropriate cleanup system may be used, one such system is described in Report No. FE-1806-25, entitled *Low BTU Fuel Combined Cycle Reference Design,* dated July 1977 and submitted to the U.S. Energy, Research and Development Agency. In order to function properly, the gas output pressure of clean-up system 20 must be maintained at a constant level. This condition is satisfied in the present invention through the combined action of coal gas plant controller 18 and a gas turbine plant controller 22 in a manner described below.

The clean gas leaving clean-up system 20 is collected in a gas supply header 24 before being applied to combined cycle power plant 14. In the embodiment illustrated, coal gasification plant 12 includes a single coal gasifier 16. If desired, coal gasification plant 12 can include a plurality of coal gasifiers 16 so as to increase the total amount of coal gas produced. In such a case, a number of such gasifiers can be served by a single gas clean-up system 20.

The coal gas leaving gas supply header 24 is applied to a gas turbine 26, which is a power generating element in the combined cycle power plant 14. Gas is applied to gas turbine 26 via a stop valve 28 and a control valve 30 whose operation is controlled by gas turbine plant controller 22. In addition to controlling the flow of coal gas into gas turbine 26 (and therefore controlling the gas consumption rate of gas turbine 26), gas turbine plant controller 22 controls the flow of liquid fuel (normally distillate) to gas turbine 26. Gas turbine plant controller 22 adjusts the flow of coal gas and liquid fuel into gas turbine 26 in such a manner as to maintain the power output of combined cycle power plant 14 in accordance with the load demand and to maintain the gas pressure in gas supply header 24 (which pressure is proportional to the gas discharge pressure of clean-up system 20) at the set point level.

Since both coal gas and liquid fuel are available, dual fuel power plant 10 may be operated in an all liquid fuel mode, a dual fuel mode and an all gas fuel mode. Manual control over these operating modes is provided by a manual control circuit 23 whose structure and operation are described below. The all liquid fuel mode of operation is used primarily during startup procedures during which gas turbine 26 is brought up to steady state operation. In this mode, gas turbine plant controller 22 closes gas stop valve 28 and supplies gas turbine 26 with liquid fuel only. The amount of liquid fuel applied to gas turbine 26 is determined by a liquid fuel command signal LFC which is generated by gas turbine plant controller 22 and applied to a liquid fuel flow controller 32. As described below, liquid fuel flow controller 32 (see FIG. 10 and the corresponding discussion thereof) applied liquid fuel contained in liquid fuel store 34 to gas turbine 26 in amounts determined by the liquid fuel command a signal LFC.

During start-up procedures, gas turbine plant controller 22 preferably controls the flow of liquid fuel into gas turbine 26 in a known manner which causes the rotational velocity of an output shaft 36 of gas turbine 26 to increase up to a desired steady state value. A description of this process may be found in General Electric Publication #GER-3107A entitled *General Electric SPEEDTRONIC Control Systems,* 1979.

In a preferred embodiment of the invention, dual fuel power plant 10 is used to generate an AC output which is applied to the power grid of a public utility. To this end, output shaft 36 is connected to an electric generator 38 which generates an output AC signal. The output of electric generator 38 is connected to the utility grid via an electrical breaker 40. During startup operation, electrical breaker 40 is open and the speed of output shaft 36 is permitted to vary in accordance with the liquid fuel flow to gas turbine 26. Once the rotational speed of output shaft 36 reaches a speed corresponding to the grid frequency (e.g., nominally 60 cycles) and the phases are matched, electrical breaker 40 is closed and the rotational velocity of output shaft 36 is fixed at a speed corresponding to the utility grid frequency due to the magnetic coupling between electric generator 38 and the utility grid. At this point, the rotational velocity of output shaft 36 remains constant (assuming constant grid frequency) and any change in the fuel flow to gas turbine 26 results in a change in the torque of output shaft 36. A change in the torque of output shaft 36, in turn, causes a change in the power output of electric generator 38. Once the startup operation has been completed and electrical breaker 40 has been closed, gas turbine plant controller 22 varies the liquid fuel flow to gas turbine 26 in a manner which causes the power output of electric generator 38 to remain at a preselected value consistent with the load demands of dual fuel power plant 10. As will be described below, this value may be manually changed so as to distribute load among several gas turbines within combined cycle power plant 14 if a plurality of gas turbines are employed.

Once electrical breaker 40 has been closed, dual fuel power plant 10 may be switched into either the dual fuel of all gas mode of operation. When operated in the dual fuel mode, power plant 10 may be operated in either of three control modes as determined by manual control circuit 23: a turbine lead mode, a turbine follow mode and an integral turbine follow mode.

When dual fuel power plant 10 is operated in the turbine lead mode, gas turbine plant controller 22 controls the operation of control valve 30 in a manner which attempts to maintain the power output of the electric generator 38 at the desired load level while concurrently maintain a minimum liquid fuel flow. Particularly, whenever the power output of electric generator 38 begins to decrease, gas turbine plant controller 22 opens control valve 30 so as to increase the flow of gas to gas turbine 26 and thereby increase the power output of electric generator 38. Conversely, whenever the power output of electric generator 38 begins to increase, gas turbine plant controller closes control valve 30 so as to decrease the flow to gas turbine 26 and thereby reduce the power output of electric generator 38. In order to maintain the pressure P1 in gas supply header 24 approximately constant, coal gas plant controller 18 either increases or decreases the rate of coal gas production in coal gasifier 16 as required to overcome the increased or decreased gas consumption by gas turbine 26. Particularly, when gas turbine plant controller 22 increases the gas flow into gas turbine 26, coal gas plant controller 18 causes coal gasifier 16 to increase production of coal gas so as to attempt to maintain the pressure P1 in gas supply header 24 constant. Conversely, when gas turbine plant controller 22 decreases the rate of fuel flow into gas turbine 26, coal gas plant controller 18 decreases the fuel production rate in coal gasifier 16 by a corresponding amount. In the event of a rapid increase in load demand and thus a rapid increase in gas consumption a transient drop in gas supply pressure P1 can occur due to the relatively slow response of the coal gasification plant 12, which will cause the gas turbine plant controller 22 to restrict the flow of gas fuel into gas turbine 26 by closing control valve 30. Whenever gas turbine plant controller 22 decreases the gas fuel flow into gas turbine 26 to prevent a further drop in the gas supply header 24, it simultaneously increases the liquid fuel flow into gas turbine 26 to maintain power output constant.

When operated in the turbine follow or integral turbine follow modes, gas turbine plant controller 22 varies the flow of gas fuel into gas turbine 26 so as to maintain the pressure p1 in gas supply header 24 approximately constant and varies the flow of liquid fuel into gas turbine 26 so as to maintain the desired power output of electric generator 38. Whenever gas turbine plant controller 22 decreases the gas fuel flow into gas turbine 26 in an effort to maintain the gas pressure in gas supply header 24 constant, it simultaneously increases the liquid fuel flow into gas turbine 26 to maintain power output at the desired load level. Conversely, whenever gas turbine plant controller 22 increases gas fuel flow into gas turbine 26, liquid fuel flow is decreased. As a result of this operation, maximum use is made of the available gas fuel being generated by the coal gasification plant and, at the same time, power output is maintained constant.

When dual fuel power plant 10 is operated in the all gas fuel mode, gas turbine plant controller 22 cuts off liquid fuel flow to gas turbine 26 and provides gas turbine 26 with gas fuel only. In this fuel mode, dual fuel power plant 10 may be operated in either of three control modes as determined by manual control circuit 23:

a turbine lead mode, a proportional turbine follow mode and an integral turbine follow mode. When dual fuel power plant 10 is operated in the turbine lead mode, gas turbine plant controller 22 control the operation of control valve 30 in a manner which attempts to maintain the power output of electric generator 38 at the desired load level. Particularly, whenever the power output of electric generator 38 begins to decrease, gas turbine plant controller 22 opens control valve 30 so as to increase the flow of coal gas to gas turbine 26 and thereby increase the power output of electric generator 38. Conversely, whenever the power output of electric generator 38 begins to increase, gas turbine plant controller 22 closes control valve 30 so as to decrease the flow of gas to gas turbine 26 and thereby reduce the power output of electric generator 38. In order to maintain the pressure P1 in gas supply header 24 approximately constant, coal gas plant controller 18 either increases or decreases the rate of coal gas production in coal gasifier 16 as required to overcome the increased or decreased gas consumption by gas turbine 26. Particularly, when gas turbine plant controller 22 increases the gas flow into gas turbine 26, coal gas plant controller 18 causes coal gasifier 16 to increase production of coal gas so as to attempt to maintain the pressure P1 in gas supply header 24 constant. Conversely, when gas turbine plant controller 22 decreases the rate of fuel flow into gas turbine 26, coal gas plant controller 18 decreases the fuel production rate in coal gasifier 16 by a corresponding amount. Since coal gasifier 16 reacts somewhat slowly to changes in the steam and air fuel flow into coal gasifier 16, the actual pressure P1 in gas supply header 24 is permitted to vary somewhat about the predetermined set point level when dual fuel power plant 10 is operated in the turbine lead mode. However, should the pressure in gas supply header 24 drop below an acceptable level gas turbine plant controller 22 will function to restrict the flow of gas fuel to gas turbine 26 until the coal gas plant controller 18 can increase the gas production rate of coal gasifier 16 and restore the gas supply header pressure to an acceptable pressure level.

When dual fuel power plant 10 is operated in either of the turbine follow modes, gas turbine plant controller 22 monitors the pressure P1 in gas supply header 24 and varies the gas fuel flow into gas turbine 26 in a manner which causes the pressure P1 in gas supply header 24 to remain approximately constant. Simultaneously, coal gas plant controller 18 monitors the power output MW of electric generator 38 and varies the coal gas production rate of coal gasifier 16 in a manner which attempts to produce the desired power output of gas turbine 26. Particularly, whenever coal gas plant controller 18 detects that the power output of electric generator 38 is dropping (or that an increase in the plant output is desired), it increases the gas production rate of coal gasifier 16, thereby increasing the pressure in gas supply header 24 and causing gas turbine plant controller 22 to increase the fuel flow to gas turbine 26 in order to maintain the pressure in gas supply header 24 constant. The increased supply of coal gas to gas turbine 26 results in an increase in the power output of gas turbine 26 and therefore an increase in the power output of electric generator 38. If the power output of electric generator 38 begins to increase (or if a reduction in plant output is desired), coal gas plant controller 18 responds by decreasing the gas production rate of coal gasifier 16. The decrease in gas production results in a decrease in the pressure in gas supply header 24, with the result that gas turbine plant controller 22 decreases gas fuel flow to gas turbine 26 and thereby decreases the power output of electric generator 38. In order to vary the coal gas production rate, coal gas plant controller 18 varies the air and steam flows into coal gasifier 16. Since coal gasifier 16 reacts somewhat slowly to changes in the input air and steam flows, the power output of electric generator 38 is permitted to vary somewhat during the two turbine follow modes of operation.

Whichever fuel mode is employed, a by-product of the operation of gas turbine 26 is gas turbine exhaust heat. The exhaust gas of gas turbine 26 is applied to a heat recovery steam generator 42 which produces steam. This steam is advantageously used by coal gasification plant 12 in the production of coal gas by coal gasifier 16. Excess steam is utilized by a separate steam turbine generator 27 to generate additional electrical power. The amount of steam generated by heat recover steam generator 42 varies as a function of the heat output of gas turbine 26. The heat output of gas turbine 26, in turn, varies as a function of the power output of gas turbine 26. As such, the power output of steam turbine generator 27 varies as a function of the power output of gas turbine 26. While combined cycle power plant 14 may be constructed without steam turbine generator 27, it is preferred to include such a generator since it makes the system economically desirable.

While any heat recover steam generator 42 may be used, one commercially available unit is manufactured by General Electric Co. and is described in General Electric publication No. STAG-4-77A entitled *Heat Recovery Steam Generators for STAG Combined Cycle Plants*. The steam produced by heat recovery steam generator 42 is applied to both coal gasifier 16 and to steam turbine 44 which drives a booster compressor 46. Booster compressor 46 receives compressed air from a turbine compressor 48 via an extraction air control valve 50 and an air header 52. In the embodiment illustrated, a combined cycle power plant 14 containing a single gas turbine 26 is shown. If desired, a plurality of gas turbine plants may be used to increase total power output. In such a case, the output of each turbine compressor 48 is applied to the single air header 52 via the extration air control valve 50.

Whenever dual fuel power plant 10 is operating in either dual fuel or an all liquid mode, compressed air must be fed to gas turbine 26 in order to atomize the liquid fuel applied thereto. To this end, a portion of turbine the output of compressor 48 is returned to gas turbine 26 via an atomizing air flow controller 54 under the control of gas turbine plant controller 22. The structure and operation of atomizing air flow controller 54 is described below with reference to FIG. 10.

Having described generally the structure and operation of dual fuel power plant 10, the specific structure and operation of the various components of dual fuel power plant 10 will now be discussed under separate headings.

B. MANUAL CONTROL CIRCUIT

Manual control circuit 23 (see FIG. 2) is normally located on the control panel of duel fuel power plant 10 and includes a fuel mode select circuit 56 and a control mode select circuit 58. Fuel mode select circuit 56 may include a three position rotary switch SW1 which is manually controlled by the operator of dual fuel power plant 10. When dual fuel power plant 10 is to be operated in the all liquid mode of operation, the movable contact of switch SW1 is placed in position 1. In this position, the position voltage +V is applied across resistor R1 via diode D1. This signal places the all liquid output signal of fuel mode select circuit 56 at the binary "1" level and indicates that the operator of dual fuel power plant 10 wants to operate gas turbine 26 in the all liquid fuel mode.

When dual fuel power plant 10 is to be operated in the dual fuel mode of operation, the movable contact of switch SW1 is moved to position 2, causing the positive voltage +V to be applied across resistor R2 via diode D2. This positive voltage places the dual fuel output signal of fuel mode select circuit 56 at the binary "1" level and indicates that the operator of dual fuel power plant 10 wants to operate gas turbine 26 in the dual fuel mode. Finally, when dual fuel power plant 10 is to be operated in the all gas mode of operation, the movable contact of switch SW1 is moved into position 3, causing the positive voltage +V to be applied across resistor R2 via diode D3. This positive voltage places the all gas output signal of fuel mode select circuit 56 at the binary "1" level and indicates that the operator of dual fuel power plant 10 wants to operate gas turbine 26 in the all gas mode. As shown in FIG. 1, these outputs are applied to gas turbine plant controller 22 which operates gas turbine 26 accordingly.

Control mode select circuit 58 includes a rotary switch SW2 which enables the operator of dual fuel power plant 10 to switch dual fuel power plant 10 between the turbine lead mode of operation and both an integral and a proportional turbine follow mode. The difference between these modes will be described in greater detail below.

When dual fuel power plant 10 is to be operated in the turbine lead mode of operation, the movable contact of switch SW2 is placed in position 1. In this condition, the positive voltage +V applied to the movable contact of switch SW2 is applied across resistor R4 via diode D4. The presence of this voltage places the turbine lead output signal TL at the binary "1" level and indicates that dual fuel power plant 10 is to be operated in the turbine lead mode. As shown in FIG. 1, the turbine lead output signal TL is applied to both coal gas plant controller 18 and gas turbine plant controller 22. When the turbine lead output signal TL is at the binary "1" level, and gas turbine plant controller 22 is actually operating gas turbine 26 in the all gas mode, gas turbine plant controller 22 varies the flow of coal gas into gas turbine 26 in a manner which causes the output of electric generator 38 to satisfy the current load demand. Simultaneously, coal gas plant controller 18 will vary the rate of gas production in coal gasifier 16 in a manner which will maintain the pressure in gas supply header 24 constant.

Whenever the turbine lead output signal TL is at the binary "0" level (i.e., turbine follow mode) and gas turbine 26 is actually being operated in the all gas mode of operation, gas turbine plant controller 22 varies the flow of coal gas into gas turbine 26 in a manner which causes the pressure in gas supply leader 24 to remain constant. Simultaneously, coal gas plant controller 18 varies the gas production rate of coal gasifier 16 in a manner which causes the output power of electric generator 38 to satisfy the current load demand. As made clear by the foregoing, the control mode (turbine lead or turbine follow) in which dual fuel power plant 10 operates is determined by the condition (binary "1" or binary "0") of the turbine lead signal TL.

When dual fuel power plant 10 is to be operated in a proportional turbine follow mode, the movable contact of switch SW2 is moved into position 2. In this position, both the turbine lead output signal TL and the integral turbine follow signals ITF are at the binary "0" levels. In this condition, control mode select circuit 58 operates dual fuel power plant 10 in the proportional turbine follow mode.

When dual fuel power plant 10 is to be operated in the integral turbine follow mode, the movable contact of switch SW2 is moved into position 3. In this position, the positive voltage +V (a binary "1") is applied across resistor R5 via diode D5. The presence of this voltage across resistor R5 places the integral turbine follow mode signal ITF at the binary "1" level and indicates that dual fuel power plant 10 is to be operated in the integral turbine follow mode. While the operator of dual fuel power plant 10 is free to operate the plant in any of these three control modes, operation in the integral turbine follow mode is satisfactory only when a single gas turbine 26 is used.

C. GAS TURBINE PLANT CONTROLLER

(1) Fuel Mode Transfer Circuit

While the operator of dual fuel power plant 10 is permitted to select the fuel mode in which he would like dual fuel power plant 10 to operate, actual transfer of operation between the three fuel modes is controlled by a fuel mode transfer circuit 82 (see FIG. 4) which forms part of gas turbine plant controller 22. Fuel mode transfer circuit 82 transfers operation of gas turbine 26 into the fuel mode selected by manual control circuit 23 only if operation in the selected fuel mode is consistent with the characteristics of the coal gas generated by coal gasifier 16 and the operating conditions of gas turbine 26. If such operation is proper, fuel mode transfer circuit 82 transfers fuel operation into the selected fuel mode by generating appropriate liquid and gas transfer command signals TRLC and TRGC, respectively. These signals are applied to fuel rate control circuit 84 which generates the liquid and gas flow control signals LFC and GFC which are applied to control valve 30 and liquid fuel flow controller 32, respectively, and directly control the fuel operation of gas turbine 26. The manner in which these signals are generated is described in some detail below. It is sufficient at this point to note that gas turbine plant controller 22 operates gas turbine 26 in the all liquid fuel mode of operation when the liquid transfer command signal TRLC is at the binary "1" level, operates gas turbine 26 in the all gas mode of operation when the gas transfer command signal TRGC is at the binary "1" level and operates gas turbine 26 in the dual fuel mode when both the liquid and gas transfer command signals TRLC and TRGC are at the binary "0" level.

A block diagram of fuel mode transfer circuit 82 is illustrated in FIG. 5. As shown therein, fuel mode transfer circuit 82 includes a gas disable circuit 86, an all gas enable circuit 88, a gas stop valve control circuit 90 and a fuel transfer signal generator 96. Gas disable circuit 86 monitors several gas parameters and permits gas operation (either dual fuel or all gas mode) only if certain predetermined conditions do not occur. Whenever any of these conditions occur, gas disable circuit 86 generates an auto liquid transfer signal AUTL (a binary "1")

which immediately transfers operation of gas turbine 26 to the all liquid fuel mode. Gas disable circuit 86 retains gas turbine 26 in this mode until a reset switch SW4 is closed. When the reset switch SW4 is closed, the auto liquid transfer signal AUTL is removed and gas operation is permitted unless any of the conditions monitored by gas disable circuit 86 are still in existence.

In the preferred embodiment, gas disable circuit 86 generates the auto liquid transfer signal AUTL whenever any of the following conditions occur:

(1) The rate of flow of coal gas to gas turbine 26 falls below a value MGP which varies as a function of the compressor discharge pressure;

(2) The gas pressure into stop valve 28 falls below a predetermined value;

(3) The temperature of the coal gas entering control valve 30 rises above a predetermined temperature;

(4) The temperature of the coal gas entering control valve 30 is less than a predetermined number of degrees (e.g. 50°) greater than the gas saturation temperature of the coal gas;

(5) Electrical Breaker 40 is opened; or (6) The heating value (e.g., the BTU value) of the coal gas falls below a predetermined minimum value.

Should any of the foregoing conditions occur, continued gas operation would be detrimental to gas turbine 26. Accordingly, gas disable circuit 86 halts gas operation and causes gas turbine plant controller 22 to operate gas turbine 26 in the all liquid mode whenever any of the foregoing conditions occur. These conditions are monitored by an OR gate 92 which generates a binary "1" at its output whenever any of the foregoing conditions occur. The binary "1" appearing at the output of OR gate 92 is applied to OR gate 94 which generates the auto liquid transfer signal AUTL (a binary "1") at its output. This signal is applied to both gas stop valve control circuit 90 and to fuel transfer signal generator 96. As will be described below, the existence of this signal causes fuel transfer signal generator 96 to place the liquid and gas transfer command signals TRLC and TRGC at the binary "1" and the binary "0" levels, respectively and causes gas stop valve control circuit 90 to close gas stop valve 28. As a result, the generation of the auto liquid transfer signal AUTL by gas disable circuit 86, places gas turbine 26 in the all liquid fuel mode.

As shown in FIG. 5, the uppermost input of OR gate 92 is coupled to an AND gate 98 via a time delay circuit 100. AND gate 98 receives a stop valve open signal SVO on its upper input and a gas minimum availability signal GMA on its lower input. The stop valve open signal SVO is generated by a valve monitor (not shown) which generates a binary "1" whenever stop valve 28 is open. The gas minimum availability signal GMA is generated by a minimum gas flow detection circuit 102 which is illustrated in FIG. 8 and described below. The gas minimum availability signal GMA is at the binary "1" level whenever the gas availability signal GASA generated by gas availability signal generator 104 (see FIG. 7) falls below a value determined by the discharge pressure of turbine compressor 48. Such a signal is generated whenever the gas flow into gas turbine 26 falls below a gas minimum level which is established as a function of compressor discharge pressure and indicates insufficient gas production in coal gasifier 16 for satisfactory operation of gas turbine 26.

Time delay circuit 100 is interposed between AND gate 98 and OR gate 92 to prevent the auto liquid transfer signal AUTL from being generated due to transient fluctuations in the value of the gas availability signal GASA. As a result, gas disable circuit 86 does not cause a transfer to the all liquid mode of operation as long as the steady state value of the gas availability signal GASA is greater than the gas minimum level.

The second input of OR gate 92 receives a gas minimum request signal GMR which is also generated by minimum gas flow detection circuit 102. As will be described in greater detail below, this signal is at the binary "1" level whenever the gas flow demand of gas turbine 26 falls below the gas minimum level determined as a function of the discharge pressure of turbine compressor 48.

The third input of OR gate 92 receives a low gas supply pressure signal LGSP which is generated by a pressure monitor (not shown) which monitors the gas pressure into stop valve 28 and generates a binary "1" whenever this pressure falls below a minimum value. This value corresponds to the minimum gas pressure required to enable proper turbine operation.

The fourth and fifth inputs of OR gate 92 receive a high gas supply temperature signal HGST and a low super heat $\Delta T$ signal LSH, respectively. The high gas supply temperature signal HGST and low super heat $\Delta T$ signal LSH are generated by a temperature monitor circuit (not shown) which monitors the temperature and pressure of the coal gas at the input of control valve 30. In order to ensure that the coal gas does not condense, its temperature must be at least a predetermined number of degrees $\Delta T$ (e.g., 50° F.) greater than the saturation temperature of the gas. Accordingly, the temperature sensing circuit determines the saturation temperature of the gas (as a function of its pressure) and causes the low super heat $\Delta T$ signal LSH to assume a binary "1" level whenever the actual temperature of the gas is less than $\Delta T$ greater than the saturation temperature thereof. The temperature sensing circuit also causes the high gas supply temperature signal to assume the binary "1" level whenever the actual temperature rises above a predetermined maximum temperature which is considered safe for proper turbine operation.

The final two inputs to OR gate 92 are the gas turbine generator breaker open signal GBO and the gas quality failure signal GQF. The gas turbine generator breaker open signal GBO assumes a binary "1" value whenever electrical breaker 40 is open. The gas quality failure signal GQF assumes a binary "1" value whenever the heating quality of the coal gas falls below a predetermined set of parameters. For example, the gas quality failure signal GQF may be generated by a fuel heating value monitor (not shown) which monitors the heating value of the coal gas in gas supply header 24 and generates a binary "1" whenever the heating value falls below a predetermined level.

As noted above, whenever any of the conditions monitored by OR gate 92 fails, gas disable circuit 86 generates an automatic liquid transfer signal AUTL (a binary "1") at its output which causes fuel transfer signal generator 96 to generate output signals which place gas turbine 26 in the all liquid mode of operation which causes gas stop valve control circuit 90 to close stop valve 28. Once gas disable circuit 86 has terminated gas operation through the generation of the automatic liquid transfer signal AUTL, the output of gas disable circuit 86 is latched into the binary "1" state due to the feedback through AND gate 106. As a result, gas turbine 26 is maintained in the all liquid mode of operation until reset switch SW4 is closed. At this time, AND gate 106 is disabled and the automatic liquid transfer signal AUTL is removed (the output of OR gate 94 is at the binary "0" level) assuming that none of the conditions monitored by OR gate 92 are present.

As noted above, gas stop valve control circuit 90 closes stop valve 28 whenever gas disable circuit 86 generates the automatic liquid transfer signal AUTL and the gas control valve 30 is closed. Particularly, the binary "1" appearing at the output of gas disable circuit 86 is applied to an inverter 108 which disables an AND gate 110 in response thereto. As a result, a binary "0" appears at the output of AND gate 110 and disables an AND gate 112. In this condition, AND gate 112 applies a binary "0" to the upper input of OR gate 114 whose remaining input will be at the binary "0" level as a result of the closure of gas control valve 30 (see below). Since both inputs to OR gate 114 are at the binary "0" level, its output (the open gas valve signal OGV) is also at the binary "0" level. As a result, gas stop valve 28 will be closed.

Even if gas disable circuit 86 does not generate the automatic liquid transfer signal AUTL, gas stop valve control circuit 90 closes stop valve 28 whenever any of the following conditions are met:

(1) The pressure across gas control valve 30 is reversed;
(2) The heating quality of the coal gas does not meet predetermined requirements;
(3) The gas pressure is gas supply header 24 rises above a predetermined maximum value;
(4) The master protective circuit which monitors the operation of gas turbine 26, detects a malfunction of the gas turbine 26;
(5) Manual control circuit 23 generates an all liquid signal;
(6) A system shut-down signal is generated; or
(7) The turbine flame is lost.

Conditions (1)-(4) are monitored by an AND gate 116. The upper input of AND gate 116 receives a gas valve ΔP correct GVC signal which is generated by a pressure monitor (not shown) which detects the pressure across gas control valve 30. As long as the pressure on the upstream side of gas control valve 30 (that side adjacent gas stop valve 28) remains higher than the pressure on the downstream side of control valve 30, the pressure sensing circuit generates a binary "1". The second input to AND gate 116 receives the inverted gas quality failure signal $\overline{GQF}$. This signal will be at the binary "1" level whenever the quality of the coal gas is satisfactory.

The inlet pressure less than maximum signal IPLM applied to the third input of AND gate 116 is generated by a comparator circuit (not shown) which compares the pressure signal P1 generated by pressure sensor 68 with a predetermined maximum value. As long as this pressure (P1) remains below the predetermined maximum value, the comparator circuit applies a binary "1" to AND gate 116.

Finally, the master protect circuit OK signal MPO applied to AND gate 116 is generated by a master protect circuit (not shown) which monitors the operation of gas turbine 26 to ensure correct operation thereof. As long as the master protect circuit is operating properly, the MPO signal will be at the binary "1" level.

Assuming that each of the foregoing inputs to AND gate 116 is at the binary "1" level, the output of AND gate 116 enables AND gates 112, 118 and 120. If any of the inputs to AND gate 116 fail (as indicated by a binary "0"), the output of AND gate 116 falls to the binary "0" level and AND gates 112, 118 and 120 are disabled. In such a case, the open gas valve signal OGV generated by OR gate 114 falls to the binary "0" level and gas stop valve 28 is closed.

In addition to receiving the output of AND gate 116, AND gates 112 and 118 each receive a flame signal FL generated by a flame monitor (not shown) which generates a binary "1" whenever a flame exists in gas turbine 26. As long as a flame exists, AND gates 112 and 118 are enabled. In the event that the flame is lost, the flame signal FL falls to the binary "0" level and AND gates 112 and 118 are disabled, causing gas stop valve 28 to be closed.

In addition to receiving the output of AND gate 116, AND gate 120 receives an $\overline{\text{ALL LIQUID}}$ and a $\overline{\text{SHUT DOWN}}$ signal. The $\overline{\text{ALL LIQUID}}$ signal is generated by an inverter circuit (not shown) connected to the all liquid output of manual control circuit 23. The $\overline{\text{SHUT DOWN}}$ signal is either manually or automatically generated and indicates that gas turbine 26 is to be shut down when it is at the binary "0" level. In the event that each of the inputs to AND gate 120 is satisfactory (as indicated by a binary "1"), AND gate 120 is enabled and generates a binary "1" at its output, thereby enabling AND gates 122, 124. In addition to receiving the output of AND gate 120, AND gates 124 receives the output of an OR gate 126. OR gate 126 receives the dual fuel and all gas signals generated by manual control circuit 23 and enables AND gate 124 whenever either of these signals are at the binary "1" level.

Whenever the output of AND gate 124 is at the binary "1" level, it enables AND gate 110 via an OR gate 128. Once AND gate 110 has been enabled by OR gate 128, it remains enabled as long as the output of AND gate 120 remains at the binary "1" levels. Thus, even if AND gate 124 is disabled due to the removal of both the dual fuel and all gas signals from OR gate 126, OR gate 128 will continue to be enabled by AND gate 122 as long as AND gate 120 continues to generate a binary "1" at its output.

While gas disable circuit 86 determines whether gas operation in either the dual fuel or all gas modes is proper, all gas enable circuit 88 determines whether transfer into and operation in the all gas mode is proper. All gas enabled circuit 88 permits transfer to the all gas mode of operation whenever:

(1) The power output of gas turbine 26 is above a predetermined value; and
(2) The amount of gas used by gas turbine 26 is less than or equal to the rate at which gas is produced by coal gasifier 16.

Once transfer to the all gas mode of operation has been completed, all gas enable circuit 88 permits continued operation in the all gas mode even if the rate at which gas is used by gas turbine 26 falls below the rate at which gas is produced by coal gasifier 16 as long as the power output of gas turbine 26 remains above a predetermined value (e.g., 5 MW).

In order to ensure that gas turbine 26 is not transferred into the all gas fuel mode when operating in the turbine follow mode or integral turbine follow mode, until the rate at which gas consumed by gas turbine 26 is in accordance with the rate at which gas is produced by coal gasifier 16 (hereinafter, the back pressure condition), all gas enable circuit 88 includes a comparator 130 which compares the total fuel command signal TFC (defined below) to the gas availability signal GASA (also defined below). When gas turbine 26 is operated in the dual fuel mode, the total fuel command signal TFC is representative of the actual total fuel required by gas turbine 26, while the gas availability signal GASA is indicative of the rate of gas consumption by gas turbine 26. Accordingly, the output of comparator 130 is at the binary "1" level whenever the back pressure condition is met.

The output of comparator 130 is applied to and AND gate 132 via an OR gate 131 and a time delay circuit 134. Time delay circuit 134 is provided to ensure that gas availability signal GASA has come to a steady state before gas turbine 26 is operated in the all gas mode. As long as the back pressure conditions are met under steady state conditions, comparator 130 enables AND gate 132 and all gas enable circuit 88 generates the gas permissive signal GP on its output if the actual turbine power output is above the predetermined minimum power output level. When dual fuel power plant 10 is operated in the turbine lead mode, the plant pressure control signal PPC applied to the lower input of OR gate 131 enables AND gate 132 and causes all gas enable circuit 88 to generate the gas permissive signal GP on its output if the actual turbine power output is above the predetermined minimum power output level. The plant pressure control signal PPC is generated whenever the plant pressure control circuit 328 (FIG. 3) is regulating the pressure in gas supply header 24.

The minimum power output requirements of gas turbine 26 are detected by a comparator 136 whose inverting input terminal receives the power output signal MW generated by a transducer 78 (FIG. 1). This signal is compared to a predetermined minimum value (5 megawatts in the example shown) in comparator 136. As long as the actual power output of gas turbine 26 (and therefore the actual power output signal MW of electrical generator 38) is above the minimum level required, comparator 136 disables an AND gate 138. As a result, AND gate 138 applies a binary "0" to an OR gate 140 thereby enabling AND gates 132, 142 via an inverter 144. The binary "0" at the output of OR gate 140 also disables an AND gate 146 such that a binary "0" is applied to both inputs of OR gate 140. In this condition, all gas enable circuit 88 generates the gas permissive signal GP at its output (the output of an OR gate 147) if: (1) the steady state back pressure or plant pressure control condition is maintained; or (2) gas turbine 26 has already been placed in the all gas mode of operation and the minimum power requirements are met.

In the event that the output power of gas turbine 26 (and therefore the power output MW of generator 38) falls below the predetermined minimum megawatt value (MMW), and the all gas signal is at the binary "1" level, comparator 136 enables AND gate 138, causing the output of OR gate 140 to latch into the binary "1" state (due to the feedback through AND gate 146). The binary "1" appearing at the output of OR gate 140 disables AND gates 132, 142 via inverter 144, thereby removing the gas permissive signal GP from the output of all gas enable circuit 88. All gas enable circuit 88 remains latched in this condition until it is reset by the closure of switch SW5.

The gas permissive signal GP is applied, along with the automatic liquid transfer signal AUTL, to fuel transfer signal generator 96. The gas permissive signal GP is applied to an AND gate 148 along with the all gas signal generated by manual control circuit 23 (FIG. 1). When the gas permissive signal GP and the all gas signal are both at the binary "1" level, AND gate 148 applies a binary "1" to the upper input of an AND gate 150. If the automatic liquid transfer signal AUTL has not been generated by gas disable circuit 86, a binary "1" is also applied to the lower input of AND gate 150 via an inverter 152, causing AND gate 150 to generate the gas transfer command signal TRGC.

The automatic liquid signal AUTL generated by gas disable circuit 86 is also applied to an OR gate 154. Whenever either the automatic liquid transfer signal AUTL or all liquid signals are at the binary "1" level, OR gate 154 generates a binary "1" at its output indicative of the presence of the liquid transfer command signal TRLC.

In summary, fuel mode transfer circuit 82: (1) generates the gas transfer command signal TRGC whenever manual control circuit 23 generates the all gas signal and the fuel and turbine parameters monitored by fuel mode transfer circuit 82 are satisfactory thereby placing dual fuel power plant 10 in the all gas mode of operation: (2) generates the liquid transfer command signal TRLC whenever either the all liquid signal is generated by manual control circuit 23 or any of the fuel and turbine parameters monitored by fuel mode transfer circuit 82 fail, thereby placing dual fuel power plant 10 in the all liquid mode of operation; and (3) removes both the gas and liquid transfer command signals TRGC and TRLC, respectively, when manual control circuit 23 generates the dual fuel output signal and the fuel and turbine parameters monitored by fuel mode transfer circuit 82 are satisfactory, thereby placing dual fuel power plant 10 in the dual fuel mode of operation.

(2) Fuel Rate Control Circuit

A block diagram of fuel rate control circuit 84 is illustrated in FIG. 6. The primary function of fuel rate control circuit 84 is to generate the liquid and gas fuel command signals LFC and GFC, respectively. These signals dictate the rate at which liquid and gas fuels are applied to gas turbine 26 and thereby dictate the power output of both gas turbine 26 and electric generator 38. When operating in the all liquid fuel mode, fuel rate control circuit 84 reduces the gas flow control signal to zero such that the liquid fuel command signal LFC is made equal to the total fuel command signal TFC. This latter signal varies as a function of the desired power output of (second occurrence) turbine 26.

When operating in the dual fuel turbine follow mode, fuel rate control circuit 84 controls the liquid and gas fuel command signals in such a manner that the power output of gas turbine 26 and the pressure in gas supply header 24 remain at the predetermined desired values DSP (FIG. 9) and SP2 (FIG. 7), respectively. In order to maintain gas pressure constant, the gas fuel command signal is GFC is varied in a manner which offsets changes in the gas production rate to thereby maintain the pressure in gas supply header 24 constant. In order to offset these variations in the gas flow to gas turbine 26, fuel rate control circuit 84 varies the liquid fuel command signal LFC in such a manner as to compensate for the changes in the gas fuel command signal GFC so as to maintain power output constant.

When operating in the dual fuel turbine lead mode, fuel rate control circuit 84 controls the liquid and gas fuel command signals LFC and GFC in such a manner that the power output of gas turbine 26 remains at the predetermined desired value DSP. In this mode, the pressure in gas supply header 24 is controlled by plant pressure control circuit 328, as described below. Fuel rate control circuit 84 will vary the liquid fuel command signal LFC and the gas fuel command signal GFC to ensure that the power output of gas turbine 26 remains constant despite variations in the amount of coal gas available. Unless gas fuel flow is restricted by the gas availability signal, GASA the liquid fuel flow will be at the minimum liquid level.

When operating in the all gas mode of operation, fuel rate control circuit 84 reduces the liquid fuel command signal LFC to zero and adjusts the gas fuel command signal GFC to either meet the power output requirements of gas turbine 26 or to maintain the pressure in gas supply header 24 constant. When gas turbine 26 is operated in the turbine lead control mode, fuel rate control circuit 84 adjusts the gas fuel command signal GFC in such a manner that the power output of gas turbine 26 remains at the desired load level. When gas turbine 26 is operated in the turbine follow mode, fuel rate control circuit 84 adjusts the gas fuel command signal GFC in such a manner that the pressure in gas supply header 24 remains constant.

As shown in FIGS. 4 and 6, fuel rate control circuit 84 receives the liquid and gas transfer command signals TRLC and TRGC, respectively, from fuel mode transfer circuit 82. These signals determine the mode of operation of fuel rate control circuit 84. Particularly, these signals determine whether fuel rate control circuit 84 generates only a liquid fuel command signal LFC (all liquid mode), only a gas fuel command signal GFC (all gas mode) or both liquid and gas command signals LFC and GFC (dual fuel mode). Fuel rate control circuit 84 also receives a total fuel command signal TFC and a gas availability signal GASA. These signals are generated by a total fuel command signal generator 156 (FIG. 4) and gas availability signal generator 104, respectively, and determine the magnitude of the liquid and gas fuel command signals LFG and GFC. While the manner in which the total fuel command signal TFC is generated is described in detail below, it is sufficient at this point to note that this signal vaires in a manner which normally maintains the power output of gas turbine 26 at the desired load set point DSP when gas turbine 26 is operated in either the all liquid or dual fuel modes of operation and which follows the magnitude of the gas availability signal GASA when gas turbine 26 is operated in the all gas mode of operation. The particular manner in which gas availability signal GASA is generated is also described in some detail below. It is sufficient at this point to note that the gas availability signal GASA varies in a manner which attempts to cause the pressure in gas supply header 24 to remain constant when gas turbine 26 is operated in the dual fuel or all gas-turbine follow modes of operation and varies in a manner which will restrict the flow of gas fuel to gas turbine 26 when the pressure in gas supply header 24 drops to a pressure below gas pressure setpoint SP1 when gas turbine 26 is operated in the all gas-turbine lead mode.

In order to describe the operation of fuel rate control circuit 84, it will first be assumed that the liquid transfer control command signal TRLC is at the binary "1" level and the gas transfer command signal TRGC is at the binary "0" level, indicating a transfer into the all liquid mode of operation. These signals are applied to both an adder 160 and an OR gate 162 which form part of a transfer timer 164. Transfer timer 164 generates a transfer timer output signal TT which causes fuel rate control circuit 84 to transfer between the all liquid, dual fuel and all gas modes of operation in a controlled manner. Since the liquid transfer command signal TRLC is at the binary "1" level, OR gate 162 enables a relay 166, causing normally closed switch SW5 to open. In this condition, the output E3 of adder 160 is negative, causing the output of an integration block 168 to integrate in a negative direction in accordance with the transfer function: $K7/S$, wherein K7 is a constant and S is the LaPlace transform indicating an integral function.

The negative going transfer timer output signal TT is applied to an adder 170 via a limit checking block 172. Limit checking block 172 defines an upper and a lower limit for the transfer timer output signal TT applied to adder 170. As shown in FIG. 6, the lower limit of limit checking block 172 is a predetermined negative value $-L1$ while the upper limit is zero. Since the transfer timer output signal TT is integrating in the negative direction, the output of limit checking block 172 quickly falls to the $-L1$ level. This signal is applied to adder 170 and is sufficiently large to offset the value of the signal appearing at the output of a low value select block 174 with the result that the output of adder 170 is negative. This output is applied to a limit checking block 176 which imposes a lower limit only. Since this limit is zero, the output of limit checking block 176 is also zero. The output of limit checking block 178 defines the gas fuel command signal GFC. As such, the gas fuel command signal GFC is zero and control valve 30 is closed when gas turbine 26 is operated in the all liquid mode of operation.

The output of limit checking block 176 is also applied to an adder 178 which generates a difference signal E4 indicative of the difference between the gas fuel command signal GFC and the output of a low value select circuit 180. Low value select circuit 180 receives both the total fuel command signal TFC and the liquid lockout signal generated by a liquid lockout circuit 182. When dual fuel power plant 10 is operated in the all liquid fuel mode, the liquid lockout signal is at a level which is greater than the total fuel command signal TFC. In this mode, gas transfer command signal TFGC is at the binary "0" level and normally closed switch SW6 is closed. As a result, the output E5 of an adder 184 is positive since constant K5 is chosen to be larger than constant K6. The positive output of adder 184 is applied to an integration block 186 whose output integrates in a positive direction. The output of integration block 186 is applied to a limit checking block 188 which imposes a lower limit only. As a result, the liquid lockout signal integrates at a controlled rate (the liquid turn-on rate) to a value which is larger than the total fuel command signal TFC. Due to this action, the output of low value select circuit 180 integrates from zero to the total fuel command signal TFC level and remains at this level as long as dual fuel power plant 10 is operated in the all liquid mode. Since the gas fuel command signal GFC is at zero, the error signal E4 appearing at the output of adder 178 is equal to the total fuel command signal TFC. This signal is applied to a limit checking block 190 which has a lower limit only. As such, the liquid fuel command signal LFC is equal to the total fuel command signal TFC when dual fuel power plant 10 is operated in the all liquid mode of operation. As will be shown below, the total fuel command signal TFC varies in a manner which maintains the power output of gas turbine 26 at the desired load set point when dual fuel power plant 10 is operated in the all liquid mode of operation. Accordingly, the liquid fuel command signal LFC is varied in a manner which retains the turbine power at the desired output.

When turbine operation is to be transferred to the dual fuel mode, both the liquid and gas transfer command signals TRLC and TRGC are switched to the binary "0" level. As a result, switch SW5 is closed and the negative transfer timer output signal TT appearing at the output of integration block 168 is applied to adder 160 after being multiplied by the dual fuel time constant K8. As a result, the output E3 of adder 160 jumps to a positive level (TRGC=TRLC=0) causing integration block 168 to begin integrating transfer timer output signal TT in a positive direction and at a rate determined by constant K8. After a short time interval, the transfer timer signal TT integrates to the zero level and remains at this level since the error signal E3 will also be zero. In this condition, the output of limit checking block 172 is zero and the gas fuel command signal GFC is permitted to vary in accordance with the output of low value select circuit 174. Low value select circuit 174 applies the lower of the gas request and gas availability signals GASR and GASA, respectively, to adder 170. As will be described in greater detail below, the gas availability signal GASA varies in a manner which attempts to keep the pressure in gas supply header 24 constant when dual fuel power plant 10 is operating in the dual fuel mode of operation. Gas request signal GASR varies as a function of the total fuel command signal TFC and is equal to the total fuel command signal TFC less the minimum liquid set point signal K3 (the output of a limit checking block 192 being zero). As long as coal gasifier 16 generates coal gas at a faster rate than the gas consumption rate of gas turbine 26 as determined by the gas request signal GASR, the gas request signal GASR is smaller than the gas availability signal GASA and gas request signal GASR is applied to adder 170. If the gas request signal GASR requests gas at a greater rate than the rate at which gas is generated in coal gasifier 16, the gas availability signal GASA falls below the gas request signal GASR and the gas availability signal is applied to adder 170. In either case, the output of low value select circuit 174 determines the magnitude of the gas fuel command signal GFC.

During the dual fuel mode, switch SW6 remains closed and the output of liquid lockout circuit 182 remains at a value greater than the total fuel command signal TFC. Accordingly, the output E4 of adder 178 is equal to the total fuel command signal TFC less the gas fuel command signal GFC. As long as the error signal E4 remains positive, it appears at the output of limit checking block 190 and defines the liquid fuel command signal LFC. Accordingly, the liquid fuel command signal LFC varies in magnitude in a complementary fashion to the gas fuel command signal GFC such that the total of the liquid and gas fuel command signals is equal to the total fuel command signal TFC. In this manner, fuel rate control circuit 84 varies the liquid and gas fuel command signals LFC and GFC in a manner which will maintain the pressure P1 in gas supply header 24 constant while at the same time maintaining the power output of electric generator 38 at the desired load set point when dual fuel power plant 10 is operated in the dual fuel mode of operation.

When operation of dual fuel power plant 10 is to switch into the all gas fuel mode, the gas transfer control signal TRGC is switched to the binary "1" level and the liquid transfer control signal TRLC remains at the binary "0" level. In this condition, relay 166 opens switch SW5 and the output of adder 160 becomes positive. The positive output of adder 160 causes the transfer timer signal TT to integrate in a positive direction, causing the output of limit checking block 172 to go to zero and causing the output of limit checking block 192 to rise to its maximum positive level L2. The positive output of limit checking block 192 is multiplied by a constant K4 which applies a minimum liquid offset signal to an adder 194. This signal is sufficiently large to offset the minimum liquid set point signal K3 to ensure that the gas request signal GASR is equal to the total fuel command signal TFC. As long as the total fuel command signal TFC is smaller than the gas availability signal GASA (as will normally be the case in the turbine lead mode), low value select circuit 174 applies the total fuel command signal TFC (i.e. the gs request signal GASR) to adder 170. As a result, the gas fuel command signal GFC is equal to the total fuel command signal TFC when dual fuel power plant 10 is operated in the all gas turbine lead mode of operation and the total fuel command signal TFC is less than the gas availability signal GASA generated by gas availability signal generator 104. Whenever the value of the gas availability signal GASA falls below the total fuel command signal TFC (as will normally be the case in the turbine follow mode), low value select circuit 174 applies the gas availability signal GASA to adder 170 and the gas fuel command signal GFC will be equal to the gas availability signal GASA. As will be shown below, the total fuel command signal TFC follows the magnitude of the gas availability signal GASA when dual fuel power plant 10 is operated in the all gas-turbine follow mode of operation. Accordingly, the output of low value select circuit 174, and therefore the value of the gas fuel control signal GFC, is determined primarily by the magnitude of the gas availability signal GASA.

During the all gas fuel mode, the liquid fuel command signal LFC must go to zero in order to cut off liquid flow to gas turbine 26. To this end, switch SW6 of liquid lockout circuit 182 is opened due to the binary "1" condition of the gas fuel transfer control signal TRGC applied to a relay 196. In this condition, the error signal E5 appearing at the output of adder 184 is negative, causing the output of integration block 186 to integrate in a negative direction. As a result, the output of limit checking block 188 quickly integrates to the zero level, thereby disabling low value select circuit 180. Since the output of low value select circuit 180 is zero, the error signal E4 appearing at the output of adder 178 is negative. The negative input to limit checking block 190 causes the liquid fuel control signal LFC to assume the zero level. As made clear by the foregoing, whenever dual fuel power plant 10 is operated in the all gas mode of operation, fuel rate control circuit 84 causes the liquid flow command signal LFC to go to zero and varies the gas fuel command signal GFC in accordance with the gas availability signal GASA in the turbine follow modes and in accordance with the total fuel command signal TFC in the turbine lead mode.

(3) Gas Availability Signal Generator

A block diagram of the gas availability signal generator 104 is illustrated in FIG. 7. The gas availability signal generator 104 receives the inverted integral turbine follow signal $\overline{ITF}$ and the gas supply header pressure signal P1 and generates a gas availability signal GASA. The gas availability signal GASA is applied to the fuel rate control circuit 84 and is used to control the flow of gas fuel to the gas turbine 26 so as to maintain the pressure in the gas supply header 24 at or above the pressure setpoint SP2 in the all gas or dual fuel modes of operation.

The gas availability signal generator 104 generates an error signal E6 at the output of an adder 202 which is representative of the difference between the actual pressure P1 in gas supply header 24 (as measured by pressure sensor 68) and the set point pressure signal SP2, which is set by the plant operator for the operating modes described below. The error signal E6 is then applied to an integral control block 204 when operated in the integral turbine follow mode or a proportional control block 206 when operated in the turbine follow and turbine lead mode. The outputs of integral and proportional control blocks 204 and 206 define the gas availability signal GASA.

The set point pressure SP2 is generated by set point control circuit 212 which includes a digital counter 218, a clock 198 and a digital to analog converter 220. The count in digital counter 218 is increased at a rate determined by the frequency of clock 198 whever a binary "1" is applied to its UP input and decreased at a rate determined by the freuqency of clock 198 whenever a binary "1" is applied to its DOWN input. The instantaneous count in digital counter 218 is applied to digital to analog converter 220 which generates the analog set point signal SP2.

The value of the set point signal SP2 is controlled by the operator of dual power plant 10. Whenever the operator wishes to increase the value of the set point signal SP2, he depresses a manual raise control switch (not shown) which applies a binary "1" to the UP input of digital counter 218. Conversely, when he wishes to decrease the count in digital counter 218, the operator depresses a manual lower control switch (not shown) which applies a binary "1" to the DOWN input of digital counter 218.

(a) Integral Turbine Follow Mode Operation

When dual fuel power plant 10 is operated in the integral turbine follow mode of operation in either the dual fuel or all gas mode, the inverted integral turbine follow logic signal $\overline{ITF}$ is at the binary "0" level. In this condition switches SW8 and SW9 are in their normally closed positions as illustrated in FIG. 7. As a result, error signal E6 is applied to integral control block 204 which varies the magnitude of the gas availability signal GASA in accordance with the integral function: $K12 + K13/S$, wherein K12 and K13 are constants and S is a LaPlace transform indicating an integration of the second term.

If the error signal E6 is positive (indicating that the actual pressure P1 is greater than the set point pressure SP2), the output of integral control block 204 (which output defines the gas availability signal GASA) increases in an integral manner until the gas fuel command signal GFC generated by the fuel rate control circuit 84, increases to a sufficient level to cause the actual pressure P1 in gas supply header 24 to be equal to the set point pressure SP2. Conversely, when the error signal E6 is negative (indicating that the actual pressure in gas supply header 24 is less than the set point pressure SP2), the output of integral control block 204, and with it the gas availability signal GASA, integrates in a negative direction so as to reduce the gas fuel command signal GFC. The error signal E6 remains negative until gas availability signal GASA, and therefore the gas fuel command signal GFC (see FIG. 6), has been reduced by a sufficient amount to cause the actual pressure P1 in gas supply header 24 to be equal to the set point pressure SP2. Whenever the actual and set point pressure signals are equal, the error signal E6 is zero, and the gas availability signal GASA appearing at the output of integral control block 204 remains at a constant level. As made clear from the foregoing, the gas availability signal generator 104 varies the magnitude of the gas availability signal GASA, and therefore the magnitude of the gas fuel command signal GFC, in a manner which causes the pressure in gas supply header 24 to remain at the set point level SP2 when dual fuel power plant 10 is operated in the integral turbine follow mode of operation in either the dual fuel or all gas fuel modes.

When operating in this mode, the pressure set point signal SP2 is set at a level below the set point SP3 of the plant flare pressure control at the desired plant nominal operating pressure. Coal gas plant controller 18 regulates the rate of fuel gas generation.

(b) Turbine Follow Mode Operation

When dual fuel power plant 10 is operated in the turbine follow mode of operation, in either the dual fuel or all gas mode, the inverted turbine follow logic signal $\overline{ITF}$ is at the binary "1" level. In this condition relays 208 and 210 are energized and switches SW8 and SW9 are in their normally opened position. As a result, error signal E6 is applied to proportional control block 206 which generates a gas availability signal GASA, which is proportional to error signal E6 by the constant of proportionality K14.

In this mode, the gas availability signal GASA, operating through the fuel rate control circuit 84, acts to regulate the flow of gas fuel to the gas turbine 26 so as to maintain the pressure P1 in gas supply header 24 above the pressure set point SP2 and coal gas plant controller 18 regulates the rate of fuel gas generation.

As the gas fuel production of the coal gasification plant 12 increases, the pressure P1 in gas supply header 24 increases. This causes an increase in the error signal E6 which in turn increases the gas availability signal GASA and thus the gas fuel flow to the gas turbine 26 up to the limit set by the total fuel command signal TFC.

Conversely, as the gas fuel production by the coal gasification plant 12 decreases, the pressure P1 in gas supply header 24 also decreases. This causes a decrease in the error signal E6 which decreases the gas availability signal GASA and thus reduces the gas fuel flow to the gas turbine 26. As the pressure in gas supply header 24 diminishes to set point SP2, the gas availability signal diminishes to zero.

When more than one gas turbine is operated from a single fuel plant in the turbine follow-mode, the distribution of gas fuel flow among the gas turbines can be set by adjusting the respective gas availability signal generator pressure set point SP2 by means of the pressure set point control circuit 212.

When dual fuel power plant 10 is operated in the turbine follow mode, set point pressure signal SP2 is set such that, taking into account the droop characteristic of proportional control block 206, the pressure in the gas supply header 24 is below the set point SP3 of the flare pressure control 342 (FIG. 3) at the desired plant nominal operating pressure at rated gas flow to the gas turbine 26.

(c) Turbine Lead Mode Operation

When dual fuel power plant 10 is operated in the turbine lead mode of operation, in either the dual fuel or all gas fuel mode, the inverted integral turbine follow logic signal $\overline{ITF}$ is at the binary "1" level. In this condition, relays 208 and 210 are energized and switches SW8 and SW9 are in their normally opened position. As a result, error signal E6 which is the difference between the gas supply header pressure signal P1 and the pressure set point signal SP2 is applied to proportional control block 206, which generates the gas availability signal GASA. In this mode of operation, the pressure in gas supply header 24 is normally regulated by the plant pressure control circuit 328 (FIG. 3) at the pressure set point SP1 and the power output of the gas turbine 26 is regulated by the total fuel command signal generator 156 (FIG. 9). The gas availability signal generator 104 is calibrated such that when the pressure in gas supply header 24 is at the pressure set point SP1, it does not restrict the flow of gas fuel to gas turbine 26 over the normal range of fuel flow.

In the event the plant is subject to a load transient which results in a decrease in the pressure in gas supply header 24, the gas availability signal generator 104 will reduce the gas availability signal GASA to below the total fuel command signal TFC, which through the operation of the fuel rate control circuit 84 will limit the flow of gas fuel to gas turbine 26. This will allow the plant pressure control circuit 328 to respond by increasing the gas production rate and increase the pressure in gas supply header 24 to the pressure set point SP1.

When dual fuel power plant 10 is operated in the turbine lead mode, set point pressure signal SP2 is set such that, taking into account the droop characteristic of proportional control block 206, a gas availability signal GASA will be generated sufficiently large to allow maximum rated fuel gas flow to gas turbine 26, when the pressure in gas supply header 24 is at or above the set point SP1 of plant pressure control circuit 328.

When gas turbine 26 is operated in the all liquid fuel mode and coal gas is being produced by coal gasifier 16, fuel rate control circuit 84 (FIG. 6) precludes the use of coal gas by gas turbine 26. This causes the coal gas supply header pressure to rise to the pressure set point SP3 of the flare pressure control 79.

(4) Total Fuel Command Signal Generator

As noted above, the total fuel command signal TFC determines the total combined flow of gas and liquid fuel to gas turbine 26 when dual fuel power plant 10 is operated in the all liquid and the dual fuel modes of operation and the all gas turbine lead mode of operation. As shown in FIG. 9, this signal is derived from a turbine control signal VCE (a pseudo-total fuel signal) and the speed N of output shaft 36. Particularly, the turbine control signal VCE (less the VCE offset signal K22) is multiplied by the speed signal N in multiplication block 224 so as to generate the total fuel command signal TFC. The total fuel command signal TFC is related to the turbine control signal VCE and the turbine speed signal N by the following equation:

TFC=(VCE−2)N/10.

The relationship between the total fuel command signal TFC and the speed signal N is of interest primarily during the turbine startup mode of operation since turbine speed N is maintained at a constant level once electrical breaker 40 is closed (assuming constant grid frequency). Accordingly, the magnitude of the total fuel command signal TFC is controlled primarily as a function of the turbine control signal VCE once electrical breaker 40 has been closed.

The turbine control signal VCE is generated by a low value select circuit 226 whose output is equal to the lowest value signal applied to its input. The uppermost input of low value select circuit 226 receives a speed-power control signal SPP which is indicative of the desired power output of electric generator 38 when dual fuel power plant 10 is operating in the all liquid or dual fuel modes of operation or the all gas turbine lead mode.

The second input to low value select circuit 226 is the temperature control signal TC which is generated by a temperature control circuit 228. Temperature control circuit 228 generates temperature control signal TC in a manner which effectively reduces the total fuel command signal TFC (and therefore reduces the fuel flow to gas turbine 26) whenever the operating temperature of gas turbine 26 increases above certain predetermined parameters. The third input to low value select circuit 226 is the startup control signal STC generated by a startup control circuit 230. Startup control circuit 230 controls the operation of dual fuel power plant 10 during the startup conditions and raises the value of the startup control signal STC from 0 up to that level required to bring gas turbine 26 up to full speed-no load operation. While any temperature control circuit 228 and startup control circuit 230 may be used, one commercially available unit which includes both circuits is manufactured by General Electric under the trademark SPEEDTRONIC.

The final input to low value select circuit 226 is the surge protection signal SGP generated by a surge protection circuit 232. The structure and operation of surge protection circuit 232 is described in some detail below. It is sufficient at this time to note that surge protection circuit 232 limits the value of the total fuel command signal TFC to ensure that the discharge pressure of turbine compressor 48 does not rise to levels which would cause surging of turbine compressor 48.

In summary, low value select circuit 226 generates the total fuel command signal TFC in accordance with the startup control circuit signal STC generated by startup control 230 during the startup of turbine 26 (i.e., prior to attaining rated speed) and thereafter generates the total fuel command signal TFC in accordance with the speed-power signal SPP unless the temperature control circuit 228 or the surge protection circuit 232 requires a cutback in the power output of electric generator 38 for safe turbine operation.

During the all liquid and dual fuel modes of operation and the all gas turbine lead mode of operation, the speed-power signal SPP is regulated in a manner which causes the actual power output MW of electric generator 38 to be equal to the load reference signal LRS. The load reference signal LRS is generated by an adder 234 which sums the error signal E10 and the digital set point signal DSP. The error signal E10 is generated by an adder 236 which determines the difference between the full speed reference signal K9 and the actual speed turbine signal N. As long as the frequency of the utility grid remains at its desired level (e.g., 60 cycles), the error signal E10 generated by adder 236 is zero. If the frequency of the utility grid rises above or below the desired value, the error signal E10 varies by a corresponding amount so as to vary fuel flow to gas turbine 26 in a manner which attempts to return the frequency of the utility grid to the desired level.

The digital set point signal DSP applied to adder 234 is generated by a digital set point circuit 238 and is indicative of the desired power output of electric generator 38. Digital set point circuit 238 includes a reversible digital counter 240 which counts up at a frequency determined by the output of clock 242 whenever a binary "1" is applied to its UP input and counts down at a rate determined by the frequency of the output of clock 242 whenever a binary "1" is applied to its DOWN input. The instantaneous count in reversible digital counter 240 is applied to a digital-to-analog converter 246 which generates the digital set point signal DSP. Accordingly, the instantaneous count in reversible digital counter 240 represents the desired power output of electric generator 38.

When dual fuel power plant 10 is operated in either the all liquid or dual fuel modes of operation, the count in reversible digital counter 240 is raised or lowered manually. Particularly, when the operator of dual fuel power plant 10 wishes to increase the power output of combined cycle power plant 14, he depresses a manual raise switch (not shown) which applies a binary "1" to an OR gate 248, causing reversible digital counter 240 to count up. Conversely, if the operator of dual fuel power plant 10 wishes to decrease the power output of combined cycle power plant 14, he depresses a manual lower switch (not shown) which applies a binary "1" to the input of an OR gate 250 causing reversible digital counter 240 to count down. The instantaneous count in reversible digital counter 240 (and therefore the value of the digital set point signal DSP) is automatically varied by a DSP tracking circuit 252 when dual fuel power plant 10 is operating in the all gas turbine follow mode. The structure and operation of DSP tracking circuit 252 is described below.

Whether controlled automatically or manually, the digital set point signal DSP is added to the error signal E10 in adder 234 to arrive at the load reference signal LRS. The load reference signal LRS (representative of the desired power output of electric generator 38) is then compared to the actual power output MW in adder 254. The power output signal MW is applied to adder 254 after being applied to a lag circuit 256 which has the transfer function $K27/(K28S+1)$ and acts as a filter circuit. The output E11 of adder 254 is therefore indicative of the difference between the actual and desired power output of electric generator 38. This signal is applied to an integration block 258 which integrates the error signal E11 in accordance with the transfer function: $K20+K21/S$. The output of integration block 258 defines the speed/power signal SPP and varies in accordance with the value of the error signal E11. Particularly, if the actual power output of electric generator 38 is less than the desired power output indicated by load reference signal LRS, the speed-power signal SPP (and with it the total fuel command signal TFC) increases in an integral manner until the power output of electric generator 38 reaches the desired value. Conversely, if the actual power output of electric generator 38 is greater than the desired value indicated by the load reference signal LRS, the speed-power signal SPP (and with it the total fuel command signal TFC) decreases in an integral manner until the actual power output is equal to the desired power output.

When dual fuel power plant 10 is operated in the all gas turbine follow mode of operation, control of the power output of electric generator 38 is provided by the coal gas plant controller 18 (turbine follow mode). During the all gas-turbine follow mode of operation, it is important that the digital set point signal DSP track the actual power output of electric generator 38 so as to prevent severe thermal transients during the subsequent transfer to the dual fuel mode of operation. It is also important that during all gas turbine follow mode of operation the total fuel command signal TFC track the gas availability signal GASA in order that a severe transient be avoided upon a transfer to dual fuel mode of operation.

Tracking of the digital set point signal DSP is provided by DSP tracking circuit 252. During the all gas turbine follow mode of operation DSP, tracking circuit 252 is enabled by the gas transfer command signal TRGC and inverted turbine lead signal $\overline{TL}$ applied to AND gates 260, 262. AND gates 260, 262 are connected to a comparator block 264 whose operation is, in turn, controlled by the error signal E12 appearing at the output of an adder 266. Adder 266 compares the actual power output MW of electric generator 38 (as offset by the bias signal K29) to the digital set point signal DSP. Whenever the error signal E12 is greater than the positive minimum value $+\Delta E$ (indicating that the actual power output is greater than the digital set point signal DSP), comparator block 264 generates a binary "1" on its UP output. This signal is applied to AND gate 260 which enables OR gate 248 and thereby increases the count in reversible digital counter 240. The count in reversible digital counter 240 continues to increase until the digital set point signal DSP becomes equal to the actual power output of electrical generator 38. Conversely, if the error signal E12 is less than the negative minimum level $-\Delta E$ (indicating that the digital set point signal DSP is greater than the actual power output), comparator block 264 generates a binary "1" on its down output. This signal is applied to AND gate 262 which enables OR gate 250 and causes reversible digital counter 240 to count down until the digital set point signal DSP is equal to the actual power output of electric generator 38.

Control of the magnitude of the total fuel command signal TFC during the all gas turbine follow mode of operation is provided by a total fuel command signal tracking circuit 268. Total fuel command signal tracking circuit 268 compares the actual total fuel command signal TFC with the fuel signal FS applied to an adder 270. The fuel signal FS is generated by an adder 272 which sums the gas availability signal GASA with the liquid fuel command signal LFC and a bias signal K24. Since the liquid fuel command signal LFC is normally zero during the all gas mode of operation, the fuel signal FS will nominally be equal to the gas availability signal GASA. As such, the error signal E13 appearing at the output of adder 270 is indicative of the difference between the instantaneous total fuel command signal TFC and the instantaneous gas availability signal GASA. The error signal E13 is applied to a lag circuit 274 which has the transfer function $K23/(K26S+1)$ and functions as a filter. The output of lag circuit 274 is applied to a limit checking block 276 which provides both a maximum and minimum limit to the output of error signal E13 as shown in FIG. 9. The output of limit checking block 276 is applied to adder 236 only during the all gas turbine follow mode of operation when a relay 278 is energized by an AND gate 261 when the gas transfer command signal TRGC and inverted turbine lead signal TL are at a binary "1" level. The output of total fuel command signal tracking circuit 268 varies the magnitude of the error signal E10, and therefore varies the magnitude of the total fuel command signal TFC in a manner which causes the total fuel command signal TFC to follow the gas availability signal GASA.

(5) Minimum Gas Flow Detection Circuit

A block diagram of the minimum gas flow detection circuit 102 is illustrated in FIG. 8. Minimum gas detection circuit 102 monitors the gas availability and gas request signals GASA, GASR, respectively, and generates either the gas minimum request signal GMR or the gas minimum availability signal GMA whenever the gas flow to gas turbine 26 to too low to safely permit continued operation in either the dual fuel or all gas modes of operation. Such a condition occurs whenever either the gas availability signal GASA or the gas request signal GASR falls below a minimum gas permissible signal MGP which varies as a function of turbine the discharge pressure of compressor 48.

The minimum gas permissible signal MGP is generated by adding a bias signal K18 to the discharge pressure P2 of turbine compressor 48 (the units of pressure P2 being converted by constant K17) and by multiplying this sum by a constant K19 which converts the sum into units comparable with the gas availability and gas request signals. The resultant product, as limited by a limit checking block 280, defines the minimum gas permissive signal MGP and is applied to the non-inverting input terminals of comparators 282, 284. A comparator 282 compares the minimum gas permissible signal MGP to the gas availability signal GASA and generates a binary "1" on its output (which output defines the gas minimum availability signal GMA) whenever the gas availability signal GASA falls below the minimum gas permissive signal MGP. This signal is applied to fuel transfer mode circuit 82 and switches operation of power plant 10 into the all liquid mode in the manner described above.

A comparator 284 compares the minimum gas permissible signal MGP to the output of an adder 286. Adder 286 sums the gas request signal GASR with the output of a limit checking block 288. The units of the gas request signal GASR and the output of limit checking block 288 are converted by constants K15 and K16, respectively, into units which can properly be compared to the minimum gas permissible signal MGP. Limit checking block 288 receives the transfer timer signal TT generated by transfer timer circuit 164 (see FIG. 6) and places a minimum limit (zero) thereon. Accordingly, the output of adder 286 is proportional to the gas request signal GASR when dual fuel power plant 10 is operated in either the dual fuel or all liquid modes of operation and is substantially larger than the gas request signal GASR when dual fuel power plant 10 is operated in the all gas fuel mode. For this reason, comparator 284 (whose output defines the gas minimum request signal GMR) never generates a binary "1" on its output when dual fuel power plant 10 is operated in the all gas mode. The output of comparator 284 will jump to the binary "1" level, however, whenever the gas request signal GASR falls below the minimum gas permissive signal MGP during the dual fuel mode of operation. This signal is applied to fuel mode transfer circuit 82 and causes dual fuel power plant 10 to switch to the all liquid mode of operation if it has been operating in the dual gas fuel mode.

(6) Surge Protection Circuit

In order to prevent the surging of turbine compressor 48, the surge protection circuit 232 (see FIG. 11) generates a surge protection signal SGP which limits the magnitude of the total fuel control signal TFC whenever the actual discharge pressure PCD of turbine compressor 48 rises above a pressure discharge limit signal PCDL which is generated as a function of compressor inlet pressure P2, compressor speed N2, compressor inlet guide vane angle IGV and compressor inlet temperature T. Particularly, a function generator 318 generates the discharge pressure limit signal PCDL in accordance with the following equation:

$$PDCL = K_o + A(P2) + B(IGV) + C(\Delta N+) - D(\Delta N-)$$

wherein $\Delta N+$ represents the increase in speed above the desired full speed value, $\Delta N-$ represents the decrease in speed below the desired full speed value and $K_o$ is a constant. The functions $A(P2)$, $B(IGV)$, $C(\Delta N+)$ and $D(\Delta N-)$ vary as a function of the temperature T.

The discharge pressure limit signal PDCL is compared to the actual discharge pressure signal PCD in an adder 320. The compressor discharge signal PCD is generated by a pressure transducer sensing pressure in the compressor discharge casing. The output E14 of adder 320 is applied to an integration block 322 which integrates this signal in accordance with the transfer function: $K31 + K32/S$, wherein K31 and K32 are constants and S is a LaPlace transform indicating an integration of the second term. The output of integration block 322 is applied to a limit checking block 324 which imposes both a maximum limit (L5) and a minimum limit (zero) on the output of integration block 322. The output of limit checking block 324 defines the surge protection signal SGP.

As long as the actual discharge pressure signal PCD is less than the discharge pressure limit signal PCDL, the output of adder 320 is positive and integration block 322 integrates in the positive direction. If the actual discharge pressure signal PCD remains less than the discharge pressure limit signal PCDL during steady state operation, the output of integration block 322 will be above the upper limit of limit checking block 324 and the surge protection signal SGP will be at the level of the L5 limit. The magnitude of the L5 limit is chosen to be greater than the normal maximum range of the speed-pressure signal SPP such that the output of low value select circuit 226 (FIG. 9) is not limited by the surge protection signal SGP whenever the discharge pressure of turbine compressor 48 remains below the value determined by function generator 318.

Whenever the discharge pressure signal PCD rises above the discharge pressure limit signal PCDL, the output E14 of adder 320 is negative and integration block 322 integrates in the negative direction. Once the output of integration block 322 falls below the magnitude of the speed-pressure signal SPP, the output of low value select circuit 226 is determined by the magnitude of the surge protection signal SGP. As a result, the gas flow into gas turbine 26 is reduced and the operation of turbine compressor 48 is brought within acceptable limits which prevent the surging thereof.

(7) Dual Fuel Dispensing System

In order to dispense both liquid and gas fuel, gas turbine 26 is provided with a plurality of dual fuel dispensing nozzles 290, only one of which is illustrated in FIG. 10. Each dual fuel dispensing nozzle 290 is connected to a respective output port of a gas manifold 292, of a liquid fuel flow divider 294 and of an air manifold 296. During the all liquid mode of operation, stop valve 28 is closed and coal gas flow to dual fuel dispensing nozzle 290 is cut off. Dual fuel dispensing nozzle 290 continues to receive liquid fuel from liquid fuel flow divider 294 and air from air manifold 296, respectively. The air received from air manifold 296 atomizes the liquid fuel and enhances combustion thereof. The amount of liquid fuel applied to dual fuel dispensing nozzle 290 is adjusted by liquid fuel flow controller 32 in accordance with the liquid fuel command signal LFC. The liquid fuel command signal LFC is compared to a liquid flow signal LF in a comparator 298 whose output is indicative of the difference between the actual fuel flow through liquid fuel flow divider 294 and the desired fuel flow as indicated by the liquid flow command signal LFC. The liquid flow signal LF is generated by a sensor circuit 300 which monitors the instantaneous fuel flow through liquid fuel flow divider 294.

The output of comparator 298 is applied to a servo valve 302 which controls the position of a bypass valve 304 in accordance with the difference between the liquid flow and liquid fuel command signals LF and LFC, respectively. When bypass valve 304 is completely closed, liquid fuel flows from liquid fuel store 34 to liquid fuel flow divider 294 at a rate determined by a liquid pump 306. As bypass valve 304 is opened, it diverts some of the fuel flow from the output of liquid pump 306 back to the input thereof so as to decrease the actual liquid fuel flow through liquid fuel flow divider 294. Servo valve 302 adjusts the position of bypass valve 304 so as to cause the liquid flow signal LF to be equal to the liquid fuel command signal LFC.

Air flow into air manifold 296 (and therefore air flow into dual fuel dispensing nozzle 290) is controlled by compressor atomizing air flow controller 54. As long as dual fuel power plant 10 is operating in either the all liquid or dual fuel modes of operation, the transfer to gas command signal TRGC is at the binary "0" level and a bypass valve 308 is closed. In this condition, discharge air from turbine compressor 48 is free to flow into air manifold 296 after an passing through coolers 310 and 312 and air compressor 314.

When dual fuel power plant 10 transfers to the dual fuel mode of operation, liquid fuel controller 32 and compressed air flow controller 54 continue to operate in the manner described. At this point, however, gas stop valve 28 opens and gas flow to gas manifold 292 (and therefore to dual fuel dispensing nozzle 290) is controlled by the position of control valve 30. In the preferred embodiment, control valve 30 has a linear characteristic and is operated under choked flow conditions such that the flow of coal gas through control valve 30 is proportional to the magnitude of the gas fuel command signal GFC.

When dual fuel power plant 10 transfers to the all gas mode of operation (TRGC equal "1"), bypass valve 308 opens and air flow to air manifold 296 is cut off. Simultaneously, a stop valve 316 is closed, cutting off liquid fuel to liquid fuel flow divider 294.

D. COAL GAS PLANT CONTROLLER

(1) Introduction

As shown in FIG. 3, the coal gas plant controller 18 includes three primary control elements: plant load control circuit 326, a plant pressure control circuit 328 and a gas fuel set point control circuit 330. These control circuits each control the operation of coal gasifier 16 during different modes of operation of dual fuel power plant 10. Control of the operation of coal gasifier 16 is transferred between control circuits 326–330 by the operation of relays 332 and 334. When dual fuel power plant 10 is operated in the all gas turbine follow mode, relay 332 is enabled, relay 334 is disabled and the throw arms of switches SW11 and SW12 are in positions 2 and 1, respectively. In this position, the gas turbine power signal GTP generated by plant load control circuit 326 is applied to gasifier feed control circuit 336 as the gas fuel demand signal GFD and controls the operation of coal gasifier 16. When the dual fuel power plant 10 is operated in either the all gas turbine lead or dual fuel turbine lead modes of operation, relay 332 is deenergized and relay 334 is energized. In this condition, the throw arm of switch SW12 is placed into position 2 and the gas pressure control signal GPC generated by plant pressure control circuit 328 is applied to gasifier feed control circuit 336 as the gas fuel demand signal GFD and controls the operation of coal gasifier 16. Finally, when dual fuel power plant 10 is operated in either the all liquid or dual fuel turbine follow modes of operation, relays 332, 334 are deenergized and the throw arm of switches SW11 and SW12 will be in position 1 as shown. In this position, the gas fuel set point signal GFS generated by gas fuel flow set point control circuit 330 is applied to the gasifier feed control circuit 336 as the gas fuel demand signal GFD and controls the operation of coal gasifier 16.

In each of the foregoing modes of operation, the gas fuel demand signal GFD controls the operation of coal gasifier 16 by controlling the magnitude of the output signals generated by gasifier feed control circuit 336. These output signals control the operation of coal gasifier 16 by controlling the flow of gasifier materials (e.g. coal, steam and air) into the gasifier. The particular signals generated by gasifier feed control circuit 336 depend upon the particular type of gasifier used. While any suitable gasifier may be used in accordance with the present invention, a fixed bed type gasifier is described. Such a gasifier generates coal gas as a function of three parameters: the amount of coal applied to the gasifier, the amount of steam applied to the gasifier and the amount of air applied to the gasifier. In order to maintain gas quality at desirable levels, the level of coal within the gasifier is preferably kept at a constant level. The rate of gas production in the gasifier is varied as a function of the amount of steam and air applied to the gasifier. In order to generate coal gas at a given rate, a predetermined amount of air and steam must be applied to the coal gasifier. The particular values of air and steam flow which must be applied to the gasifier in order to generate a given rate of coal gas will vary as a function of the particular coal gasifier. For any given gasifier and coal composition, the relationship between the air and stream flow rates and the coal gas production rate is fixed.

Assuming that a fixed bed type gasifier is used, gasifier feed control circuit 336 generates air feed and steam feed signals AF and SF, respectively, whose magnitudes vary as a function of the magnitude of the gas fuel demand signal GFD. By way of example, gasifier feed control circuit 336 can include look-up tables which generate air flow and steam flow signals of the proper magnitude to cause coal gasifier 16 to generate coal gas at a rate determined by the magnitude of the gas fuel demand signal GFD. These signals will be applied to valves 29 and 31, respectively, and adjust the position of these valves, and therefore the flow of air and steam into coal gasifier 16, accordingly. See FIG. 1.

In addition to generating the air flow and steam flow signals, gasifier feed control circuit 336 generates a coal flow signal CF which varies the flow of coal into coal gasifier 16 in an effort to ensure that the level of coal in coal gasifier 16 remains constant. Since the level of coal in coal gasifier 16 varies as a function of the amount of coal gas being generated (the greater the coal gas production rate, the greater the reduction in the level of coal in coal gasifier 16), a look-up table may also be used to generate the coal flow signal CF as a function of the gas fuel demand signal GFD. It is preferred, however, that an additional feedback circuit be used to make fine adjustments in the coal feed signal CF to ensure that the level of coal in coal gasifier 16 remains at the desired level. Particularly, an appropriate sensor can be placed in coal gasifier 16 to generate a signal indicative of the actual level of coal in coal gasifier 16. This signal is applied to the gasifer feed control circuit 336 and is used by an appropriate feedback loop to adjust the value of the coal feed signal CF to the desired level.

The foregoing description of gasifier feed control circuit 336 assumes that a fixed bed type gasifier is used. Other type gasifiers will require different inputs to control the operation thereof. For example, the Texaco Oxygen Blow Entrained Bed Gasifier varies the production of coal gas as a function of a coal/water slurry and oxygen flow. If such a gasifier is used, gasifier feed control circuit 336 must be modified to generate signals which control these two parameters.

While the structure and operation of controllers 326–330 is described in greater detail below, the function of each of these controllers will be reviewed briefly at this point.

As noted above, plant load control circuit 326 controls the operation of coal gasifier 16 when dual fuel power plant 10 is operated in the all gas turbine follow mode. To this end, plant load control circuit 326 monitors the value of the turbine lead signal $\overline{TL}$ and the transfer to gas command signal TRGC to determine the mode of operation of dual fuel power plant 10. When the turbine lead and transfer to gas command signals TL, TRGC are at the binary "0" and binary "1" levels, respectively, dual fuel power plant 10 is operating in the all gas turbine follow mode and plant load control circuit 326 assumes control of operation of coal gasifier 16. To this end, plant load control circuit 326 generates a plant load control signal PLC (a binary "1") which enables relay 332 and generates a gas turbine power signal GTP whose magnitude varies in a manner which attempts to maintain the actual power output of gas turbine 26 at a level consistent with current load demands. During this mode of operation, gas turbine plant controller 22 operates to maintain the pressure P1 in the gas supply header 24 at the preset level SP2 (determined by gas availability signal generator 104) despite changes in the gas production rate.

When dual fuel power plant 10 is not being operated in the all gas turbine follow mode of operation, control over the operation of coal gasifier 16 is transferred to either plant pressure control circuit 328 or gas fuel set point control circuit 330. In either case, plant load control circuit 326 stops generating the plant load control signal PLC and causes the magnitude of the gas turbine power signal GTP to follow the magnitude of the gas fuel demand signal GFP. The value of the gas turbine power signal GTP follows that of the gas fuel demand signal GFD so as to prevent severe thermal transients when control over coal gasifier 16 is returned to plant load control circuit 326.

When the plant load control signal PLC is not generated, relay 332 is deenergized, the throw arm of switch SW11 is in position 1 and the operation of coal gasifier 16 is controlled by either plant pressure control circuit 328 or gas fuel flow set point circuit 330. Transfer of operation between these two control circuits is determined by the position of switch SW12 whose operation is controlled by relay 334. The operation of relay 334 is, in turn, controlled by plant pressure control circuit 328.

Plant pressure control circuit 328 monitors the turbine lead signal TL and the transfer to liquid command signal TRLC and assumes control over the operation of coal gasifier 16 whenever dual fuel power plant 10 is operated in either the all gas turbine lead or dual fuel turbine lead modes of operation. When this condition occurs (in both cases, the turbine lead signal TL and the inverted transfer to liquid command TRLC will both be at the binary "1" level), plant pressure control circuit 328 generates a plant pressure control signal PPC (a binary "1") which energizes relay 334 causing the throw arm of switch SW12 to move to position 2. As a result, the magnitude of the gas fuel demand signal GFD is determined by the gas pressure control signal GPC generated by plant pressure control circuit 328. Plant pressure control circuit 328 varies the magnitude of the gas pressure control signal GPC to maintain the pressure P1 in gas supply header 24 at a predetermined level SP1. During this mode of operation, the power output of turbine 26 is varied by gas turbine plant controller 22 and plant pressure control circuit 328 operates to vary the gas production rate of coal gasifier 16 to offset variations in the amount of coal gas consumed by gas turbine 26. Plant pressure control circuit 328 also includes circuitry which precludes transfer of control of coal gasifier 16 to the plant pressure control circuit 328 whenever the pressure P1 in gas supply header 24 varies by more than a predetermined pressure from the desired set point pressure to reduce the potential for subjecting the gasifier to an extreme transient.

When dual fuel power plant 10 is operated in any mode other than the all gas turbine lead or dual fuel turbine lead modes, plant pressure control circuit 328 varies the magnitude of the gas pressure control signal GPC to follow the magnitude of the gas fuel demand signal GFD. The gas pressure control signal GPC follows the gas fuel demand signal GFD to avoid severe thermal transients when control over the operation of coal gasifier 16 is returned to plant pressure control circuit 328.

Finally, when dual fuel power plant 10 is operated in either the all liquid fuel mode or in the dual fuel turbine follow mode, relays 332 and 334 are both deenergized and control over the operation of coal gasifier 16 is transferred to gas fuel flow set point control circuit 330. Gas fuel set point control circuit 330 generates a gas fuel set point signal GFS which causes coal gasifier 16 to produce coal gas at a predetermined rate which is independent of both the power output of gas turbine 26 and the pressure in gas supply header 24. During these modes of operation, gas turbine plant controller 22 controls the power output of gas turbine 26 and flare pressure control circuit 342 controls the pressure in gas supply header 24. Particularly, flare pressure control circuit 342 monitors the pressure P1 in gas supply header 24 and generates a control signal FCV which adjusts the position of a flare control valve 21 (see FIG. 1) in a manner which maintains the pressure P1 in gas supply header 24 at a predetermined set point level SP3 determined by the operator of dual fuel power plant 10.

In summary, coal gas plant controller 18 controls the operation of coal gasifier 16 as follows:

1. When dual fuel power plant 10 is operated in the all gas turbine follow mode of operation, plant load control circuit 326 adjusts the operation of coal gasifier 16 to ensure that coal gasifier 16 generates coal gas at a rate required to maintain the power output of gas turbine 26 at a desired level;

2. When dual fuel power plant 10 is operated in either the all gas turbine lead or dual fuel turbine lead modes of operation, plant pressure control circuit 328 controls the operation of coal gasifier 16 to ensure that coal gasifier 16 generates coal gas at a rate which maintains the pressure P1 in gas supply header 24 at a preset level SP1; and 3. When dual fuel power plant 10 is operated in either the all liquid or dual fuel turbine follow modes of operation, gas fuel flow set point control circuit 330 controls the operation of coal gasifier 16 to ensure that coal gasifier 16 maintains the rate of reduction of coal gas at a predetermined level independent of the power output of gas turbine 26 and independent of the pressure in gas supply header 24.

(2) Plant Load Control Circuit

The structure of plant load control circuit 326 is illustrated in FIG. 12. Plant load control circuit 326 operates in two alternative modes: an active and a passive mode. Plant load control circuit 326 operates in the active mode when dual fuel power plant 10 is operated in the all gas turbine follow mode. Plant load control circuit 326 operates in the passive mode at all other times. During the active mode of operation, plant load control circuit 326 controls the operation of coal gasifier 16. To this end plant load, control circuit 326 generates the plant load control signal PLC which energizes relay 332 and adjusts the magnitude of the gas turbine power signal GTP in a manner which varies the coal gas output of turbine gasifier 16 to maintain the power output of gas turbine 26 at a desired set point level PSP. During the passive mode of operation, plant load control circuit 326 does not generate the plant load control signal PLC and varies the magnitude of the gas turbine power signal GTP to follow the instantaneous value of the gas fuel demand signal GFD.

Plant load control circuit 326 is transferred between the active and passive modes of operation by control mode logic circuit 344. Control mode logic circuit 344 monitors the transfer to gas command signal TRGC and the turbine lead signal TL and generates the plant load control signal PLC whenever these signals indicate that dual fuel power plant 10 is being operated in the all gas turbine follow mode of operation. To this end, control mode logic circuit 344 includes an AND gate 352 and an inverter 354. AND gate 352 receives the transfer to gas command signal TRGC on its lower input and receives the inverted turbine lead signal $\overline{TL}$ on its upper input. As such, AND gate 352 generates the plant load control signal PLC (a binary "1") whenever the transfer to gas command signal TRGC is at the binary "1" level and the turbine lead signal TL is at the binary "0" level.

As described above, the plant load control signal PLC is applied to relay 332 to transfer control over the operation of coal gasifier 16 to plant load control circuit 326. The plant load control signal PLC is also applied to a load set point control circuit 346 and a fuel demand tracking circuit 350.

Load set point control circuit 346 generates a power set point signal PSP which is indicative of the desired power output of gas turbine 26 when dual fuel power plant 10 is operated in the all gas turbine follow mode of operation and which varies as a function of the actual power output of gas turbine 26 at all other times. The magnitude of the power set point signal PSP is determined by a reversible digital counter 356 whose output is applied to a digital to analog converter 358. The count in reversible digital counter 356 is increased at a frequency determined by a clock 360 whenever a binary "1" is applied to its up input and is decreased at a rate determined by clock 360 whenever a binary "1" is applied to its down input. Whenever dual fuel power plant 10 is operating in the all gas turbine follow mode of operation, AND gates 362 and, 364 are disabled by the plant load control signal PLC (which is applied to an inverter 366) and the count in reversible digital counter 356 is manually controlled by the operator of dual fuel power plant 10. Whenever the operator of dual fuel power plant 10 wishes to increase the power output of gas turbine 26, he depresses a manual raise control switch (not shown) which applies a binary "1" to an OR gate 368. As a result, a binary "1" is applied to the UP input of reversible digital counter 356 and the count in reversible digital counter 356 is increased accordingly. Whenever the operation of dual fuel power plant 10 wishes to decrease the power output of gas turbine 26, he depresses a manual lower control switch (not shown) which applies a binary "1" to an OR gate 370. As a result, a binary "1" is applied to the DOWN input of reversible digital counter 356 and the count in reversible digital counter 356 is decreased accordingly. As such, load set point control circuit 346 generates a power set point signal PSP indicative of the desired power output of gas turbine 26 whenever dual fuel power plant 10 is operated in the all gas turbine follow mode of operation. During this mode of operation, the power set point signal PSP is applied to a gas turbine power signal generator 348 which varies the magnitude of the gas turbine power signal GTP to maintain the actual power output of gas turbine 26 at the set point level PSP.

When dual fuel power plant 10 is operating in any mode other than the all gas turbine follow mode, control mode logic circuit 344 does not generate the plant load control signal PLC and plant load control circuit 326 is operated in the passive mode. As a result, AND gates 362, and 364 are enabled and their operation is controlled by a comparator block 372. AND gate 362 applies a binary "1" to OR gate 368 whenever a binary "1" appears at the UP output of comparator block 372. In such case, a binary "1" is applied to the UP input of reversible digital counter 356 and the count in reversible digital counter 356 increases at a rate determined by the frequency of clock 360. AND gate 364 applies a binary "1" to OR gate 370 whenever a binary "1" appears at the DOWN output of comparator block 372. In such case, a binary "1" is applied to the DOWN input of reversible digital counter 356 and the count in reversible digital counter 356 decreases at a rate determined by clock 360.

Comparator block 372 receives an error signal E15 which is generated by an adder 374. Adder 374 generates error signal E15 by comparing the instantaneous value MW of the power output of gas turbine 26 to the power set point signal PSP. As long as the value of the power set point signal PSP stays within $\Delta E'$ watts of the actual power signal MW, comparator block 372 generates no output signal and the count in counter 356 remains constant. Whenever the actual power output MW rises above the set point value PSP by $\Delta E'$ watts, the error signal E15 becomes positive and causes comparator block 372 to generate a binary "1" on its UP output. Conversely, whenever the actual power output MW falls below the set point value PSP by $\Delta E'$ watts, comparator block 372 generates a binary "1" on its DOWN output. As a result, the count in reversible digital counter 356, and therefore the value of the power set point signal PSP, tracks the actual power output MW of gas turbine 26 whenever plant load control circuit 326 is operated in the passive mode.

The power set point signal PSP is applied to an adder 376 of the gas turbine power signal generator 348. Adder 376 also receives a speed error signal (K36−N) which indicates whether or not gas turbine 26 is operating at rated speed. The signal K36 is indicative of the rated speed of gas turbine 26 (normally that rotational velocity of output shaft 36 corresponding to the 60 cycle grid frequency) and N is indicative of the actual speed of output shaft 36. As a result, the power reference signal PRS establishes the desired power output of gas turbine 26 as adjusted by the speed error signal and attempts to maintain the frequency of the electrical grid at the desired level.

The power reference signal PRS is applied to an adder 378 wherein it is compared to the actual power output MW of gas turbine 16. The error signal E16 is applied to an integration block 380 which integrates the error signal E16 in accordance with the transfer function: $K37 + K38/S$, wherein K37 and K38 are constants and S is the LaPlace transform operator indicating integration of the second term. Whenever the error signal E16 is positive (indicating an under power condition), the output of integration block 380 integrates in a positive direction to increase the gas turbine power signal GTP and thereby increase the gas production rate of coal gasifier 16. Conversely, whenever the error signal E16 is negative (indicating an over power condition), the output of integration block 380 integrates in a negative direction to reduce the gas turbine power signal GTP and therefore the gas production rate of coal gasifier 16.

As noted above, the magnitude of the gas turbine power signal GTP follows the magnitude of the gas fuel demand signal GFD whenever dual fuel power plant 10 is operating in any mode other than the all gas turbine follow mode of operation. To this end, plant load control circuit 326 includes fuel demand tracking circuit 350 whose output is applied to an adder 382 along with error signal E16.

When dual fuel power plant 10 is operated in the all gas turbine follow mode of operation (and plant load control circuit 326 is operated in the active mode), the plant load control signal PLC energizes a relay 384 causing the throw arm of switch SW13 to move into position 2. In this condition, the output of fuel demand tracking circuit 350 is zero and adder 382 applies the error signal E16 directly to integration block 380 as described.

When dual fuel power plant 10 is operated in other than the all gas turbine follow mode (and plant load control circuit 326 is operated in the passive mode), relay 384 is disabled and the throw arm of switch SW13 is applied to position 1. In this condition, adder 382 receives the output of an integration block 386. Integration block 386 receives the error signal E17 which is generated by an adder 388 which compares the instantaneous value of the gas turbine power signal GTP to the gas fuel demand signal GFD and generates the error signal E17 as a function thereof. The error signal E17 is integrated by integration block 386 in accordance with the following transfer function: $K39/K40S+1)$, wherein K39 and K40 are constants and S is the LaPlace transform operator. As a result, the output of integration block 386 varies in a manner which attempts to maintain the value of the gas turbine power signal GTP equal to the value of the gas fuel demand signal GFD whenever plant load control circuit 326 is operated in the passive mode.

(3) Plant Pressure Control Circuit

The structure of plant pressure control circuit 328 is illustrated in FIG. 13. Plant pressure control circuit 328 operates in two alternative modes: an active mode and a passive mode. Plant pressure control circuit 328 operates in the active mode when dual fuel power plant 10 is operated in either the all gas turbine lead or dual fuel turbine lead modes of operation. Plant pressure control circuit 328 operates in the passive mode at all other times.

During the active mode of operation, plant pressure control circuit 328 controls the operation of coal gasifier 16. To this end, plant pressure control circuit 328 generates the plant pressure control signal PPC and varies the magnitude of the gas pressure control signal GPC in a manner which maintains the pressure P1 in gas supply header 24 at the desired set point level SP1. During the passive mode of operation, plant pressure control circuit 328 does not generate the plant pressure control signal PPC and varies the magnitude of the gas pressure control signal GPC to follow the instantaneous value of the gas fuel demand signal GFD.

Plant pressure control circuit 328 is transferred between the active and passive modes of operation by a control mode logic circuit 390. Control mode logic circuit 390 monitors the transfer to liquid command signal TRLC, the turbine lead signal TL and the pessure error control signal PEC and generates the plant pressure control signal PPC whenever these signals indicate that dual fuel power plant 10 is to be operated in either the all gas turbine lead or dual fuel turbine lead modes of operation. Whenever control mode logic circuit 390 generates the plant pressure control signal PPC, it places plant pressure control circuit 328 in the active mode of operation. At all other times, plant pressure control circuit 328 is operated in the passive mode of operation.

Control mode logic circuit 390 includes an AND gate 392, OR gate 393 and an inverter 394. AND gate 392 receives the pressure error control signal PEC on its upper input, the turbine lead signal TL on its middle input and the inverted transfer to liquid command signal $\overline{TRLC}$ on its lower input. As such, AND gate 392 generates the plant pressure control signal PPC (a binary "1")

on its output whenever the turbine lead signal TL and the pressure error control signal PEC is at the binary "1" level and the transfer to liquid command signal TRLC is at the binary "0" level. Once the plant pressure control signal PPC is at the binary "1" state indicating the plant pressure control is active, OR gate 393 operates to eliminate the requirement that the pressure error signal PE remain at the binary "1" state to remain in the active mode. This prevents dynamic errors in the signal E18 from disabling the plant pressure control circuit 328.

As described above, the plant pressure control signal PPC is applied to relay 334 so as to transfer control over the operation of coal gasifier 16 to plant pressure control circuit 328. The plant pressure control signal PPC is also applied to a fuel demand tracking circuit 396 and transfers plant pressure control circuit 328 between the active and passive modes of operation.

When control mode logic circuit 390 generates the plant pressure control signal PPC, a relay 398 of fuel demand tracking circuit 396 is energized, causing the throw arm of switch SW14 to move to position 2. In this condition, the output of fuel demand tracking circuit 396 is zero and a gas pressure signal generator 400 is free to generate the gas pressure signal GPC as a function of the difference between the instantaneous pressure P1 in gas supply header 24 and the set point pressure SP1. The set point pressure SP1 is generated by a set point control circuit 402 which includes a digital counter 404, a clock 406 and a digital to analog converter 408. The count in digital counter 404 is increased at a rate determined by the frequency of clock 406 whenever a binary "1" is applied to its UP input and decreased at a rate determined by the frequency of clock 406 whenever a binary "1" is applied to its DOWN input. The instantaneous count in digital counter 404 is applied to digital to analog converter 408 which generates the analog set point signal SP1.

The count in digital counter 404, and therefore the value of the set point signal SP1, is controlled by the operator of dual fuel power plant 10. Whenever the operator wishes to increase the value of the set point signal SP1, he depresses a manual raise control switch (not shown) which applies a binary "1" to the UP input of digital counter 404. Conversely, when he wishes to decrease the count in digital counter 404, the operator depresses a manual lower control switch (not shown) which applies a binary "1" to the DOWN input of digital counter 404.

The set point signal SP1 is applied to an adder 410 of gas pressure signal generator 400 which compares the set point signal to the actual pressure P1 in gas supply header 24. Adder 410 generates an error signal E18 indicative of the difference between the set point signal SP1 and the actual pressure signal P1. Error signal E18 is applied to an adder 412 and a comparator 414. When plant pressure control circuit 328 is operating in the passive mode, adder 412 applies the error signal E18 directly to an integration block 416 which integrates the error signal E18 in accordance with the following transfer function: K41+K42/S, wherein K41 and K42 are constants and S is the LaPlace transformer operator. The output of integration block 416 defines the gas pressure control signal GPC and varies in a manner which causes the pressure in gas supply header 24 to remain at the set point value SP1.

Comparator 414 compares the error signal E18 to a predetermined value $\Delta E''$ and sets the pressure error control signal PEC equal to binary "0" whenever the magnitude of the error signal E18 (positive or negative) is greater than $\Delta E''$. The generation of the pressure error control signal PEC prevents a transfer of plant pressure control circuit 328 into the active mode of operation until plant pressure P1 is within the prescribed limits $\Delta E''$ of the pressure setpoint SP1). This insures a smooth transfer from the plant flare pressure control circuit 342 to the plant pressure control circuit 328.

When plant pressure control circuit 328 is operated in the passive mode (control mode logic circuit 390 does not generate the plant pressure control signal PPC), relay 398 is deenergized and the throw arm of switch SW14 moves to position 1. As a result, switch SW14 applies the output of an integration block 418 to adder 412. Integration block 418 receives error signal E19 which is generated by an adder 420 as a function of the difference between the instantaneous value of the gas pressure control signal GPC to the instantaneous value of the gas fuel demand signal GFD. The error signal E19 is integrated by integration block 418 in accordance with the following transfer function: K43/(K44S+1), wherein K43 and K44 are constants and S is the LaPlace transform operator.

The output of integration block 418 is applied to adder 412 and serves to adjust the value of the gas pressure control signal GPC during the passive mode of operation of plant pressure control circuit 328. Particularly, the output of integration block 418 causes the magnitude of the gas pressure control signal GPC to follow the magnitude of the gas fuel demand signal GFD during this mode.

(4) Gas Fuel Set Point Control Circuit

The structure of the gas fuel flow set point control circuit 330 is illustrated in FIG. 14. Gas fuel flow set point control circuit 330 operates in two alternative modes: an active mode and a passive mode. Gas fuel flow set point control circuit 330 is operated in the active mode of operation whenever dual fuel power plant 10 is operated in either the all liquid or dual fuel turbine follow modes of operation. Gas fuel flow set point control 330 is also operated in the active mode when dual fuel power plant 10 is operated in the dual fuel turbine lead mode of operation and the actual pressure P1 in gas supply header 24 is not within the predetermined range of the pressure setpoint SP1 as determined by plant pressure control circuit 328. See Section IV. (D) (3), supra. Gas fuel flow set point control circuit 330 operates in the passive mode at all other times.

During the active mode of operation, gas fuel flow set point control circuit 330 controls the operation of coal gasifier 16. Particularly, plant pressure control circuit 328 causes coal gasifier 16 to generate coal gas at a predetermined rate set by the operator of dual fuel power plant 10. To this end, gas fuel flow set point control circuit 330 generates the gas fuel set point signal GFS whose magnitude is set by the operator of dual fuel power plant 10. During the passive mode of operation, gas fuel flow set point control circuit 330 varies the magnitude of the gas fuel set point signal GFS to follow the instantaneous value of the gas fuel demand signal GFD to protect against severe thermal transients when control over the operation of coal gasifier 16 is returned to gas fuel flow set point control circuit 330.

Gas fuel flow set point control circuit 330 is transferred between the active and passive modes of operation by an OR gate 422. OR gate 422 monitors the transfer to gas command signal TRGC and the plant presure control signal PPC and places gas fuel flow set point control circuit 330 in the passive mode of operation whenever either of these signals is at the binary "1" level. At all other times, OR gate 422 places gas fuel flow set point control circuit 330 in the active mode of operation.

During the active mode of operation, OR gate 422 disables a fuel demand tracking circuit 424 and the operation of a gas fuel set point signal generator 426 is controlled manually by the operator of dual fuel power plant 10. Gas fuel set point signal generator 426 includes a reversible digital counter 428 whose instantaneous count determines the magnitude of the gas fuel set point signal GFS. The count in reversible digital counter 428 is increased at a rate determined by the frequency of clock 430 whenever a binary "1" is applied to its UP input and is decreased at a rate determined by the frequency of clock 430 whenever a binary "1" is applied to its DOWN input. The count in reversible digital counter 428 is applied to a digital to analog converter 432 whose output defines the gas fuel set point signal GFS.

When the operator of dual fuel power plant 10 wishes to raise the gas fuel set point signal GFS, he depresses a manual raise control switch (not shown) which applies a binary "1" to an OR gate 434. This signal is applied to the UP input of counter 428 and causes the count in reversible digital counter 428 to increase accordingly. When the operator of dual fuel power plant 10 wishes to decrease the gas fuel set point signal GFS, he depresses a manual lower control switch (not shown) which applies a binary "1" to an OR gate 436. This signal is applied to the DOWN INPUT of reversible digital counter 428 and causes the count in reversible digital counter 428 to decrease accordingly.

During the passive mode of operation, OR gate 422 enables fuel demand tracking circuit 424 by enabling AND gates 438 and 440. AND gate 438 is connected to the UP output of comparator 442 and causes the count in reversible digital counter 428 to increase whenever a binary "1" appears at the Up output of a comparator 442. AND gate 440 is connected to the DOWN output of comparator 442 and causes reversible digital counter 428 to count down whenever a binary "1" appears at the DOWN output of comparator 442.

Comparator 442 receives an error signal E20 which is generated by an adder 446 and is indicative of the difference between the instantaneous value of the gas fuel demand signal GFD and the instantaneous value of the gas fuel set point signal GFS. Whenever the error signal E20 is positive and greater in magnitude than a predetermined value $\Delta E'''$ (indicating that the gas fuel set point signal GFS is less than the gas fuel demand signal GFD), comparator 442 generates a binary "1" on its UP output causing the count in reversible digital counter 428 to rise. Whenever the error signal E20 is negative and is greater in magnitude than the predetermined value $\Delta E'''$ (indicating that the gas fuel set point signal GFS is greater than the gas fuel demand signal GFD), comparator 442 generates a binary "1" on its DOWN output, causing the count in reversible digital counter 428 to decrease. As a result, fuel demand tracking circuit 424 causes the count in reversible digital counter 428, and therefore the value of the gas of fuel set point signal GFS, to follow the magnitude of the gas fuel demand signal GFD whenever gas fuel flow set point control circuit 330 is operating in its passive mode.

(5) Flare Pressure Control Circuit

Figure 15:
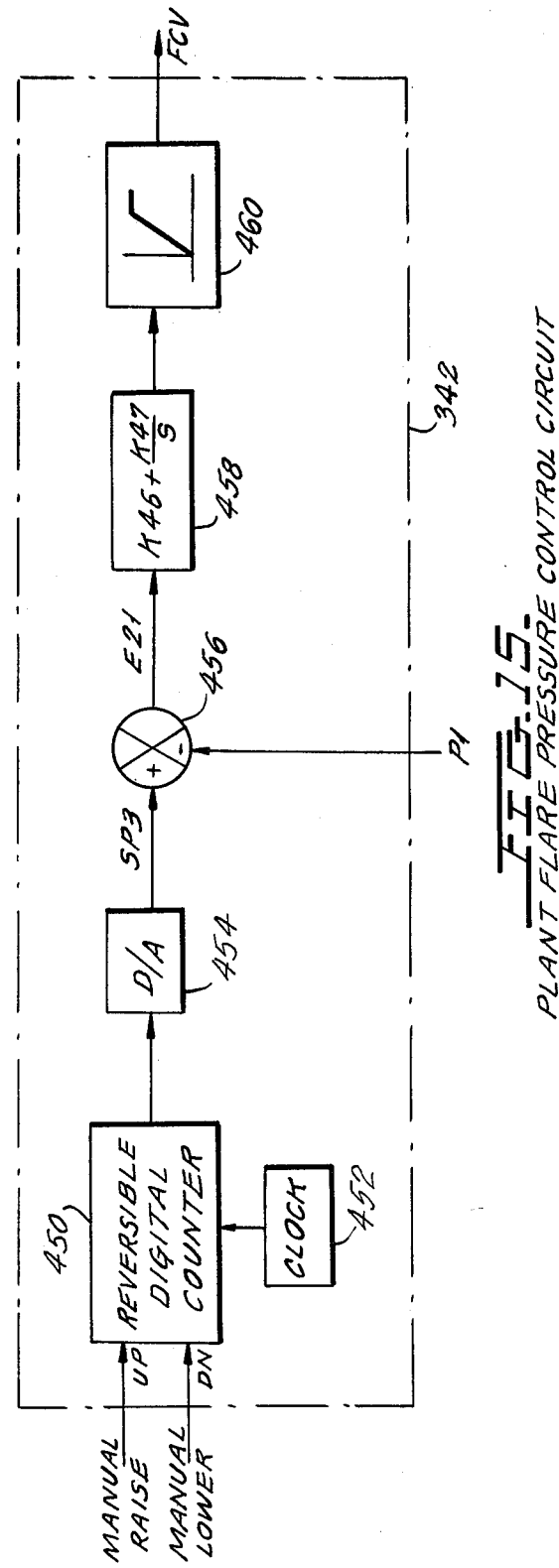
FIG. 15 is a block diagram of the flare pressure control circuit of FIG. 3.

The structure of flare pressure control circuit 342 is illustrated in FIG. 15. Flare pressure control circuit 342 generates a flare control valve signal FCV which controls the operation of the flare control valve 21 (see FIG. 1). Particularly, flare pressure control circuit 342 adjusts the position of flare control valve 21 to ensure that the pressure P1 in gas supply header 24 remains at or below the set point level SP3. Under normal conditions, the pressure in gas supply header 24 will be maintained at the set point level SP3 only during the all liquid mode of operation. During this mode, coal gasifier 16 generates coal gas at a rate determined by the gas fuel set point signal GFS and the pressure in gas supply header 24 is permitted to increase to the set point level SP3. During the dual fuel and all gas modes of operation, the pressure in gas supply header 24 is normally maintained at the set point level SP1 by plant pressure control circuit 328 or at the set point level SP2 by the gas availability signal generator 104 since the set point level SP3 is normally set to be higher than the set point levels SP1 and SP2.

The particular value of the set point signal SP3 is determined by the instantaneous count in a reversible digital counter 450 and is controlled by the operator of dual fuel power plant 10. The count in reversible digital counter 450 increase at a rate determined by the frequency of a clock 452 whenever a binary "1" is applied to its UP input and is decreased at a rate determined by clock 452 whenever a binary "1" is applied to its DOWN input. When the operator of dual fuel power plant 10 wishes to raise the set point pressure SP3, he depresses a manual raise control switch (not shown) which applies a binary "1" to the UP input of reversible digital counter 450 and causes the count in reversible digital counter 450 to increase accordingly. When the operator wishes to decrease the set point signal SP3, he depresses a manual lower control switch (not shown) which applies a binary "1" to the DOWN input of reversible digital counter 450 and causes the count in reversible digital counter 450 to decrease accordingly.

The digital count in reversible digital counter 450 is applied to a digital to analog converter 454 whose output represents the set point signal SP3. The value of the set point signal SP3 is compared in an adder 456 to the actual pressure P1 in gas supply header 24. Adder 456 generates an error signal E21 whose magnitude is determined by the difference between the set point and actual pressure signals SP3 and P1, respectively. The error signal E21 is applied to an integration block 458 which integrates the error signal E21 in accordance with the transfer function: $K46+K47/S$, wherein K46 and K47 are constants and S is the LaPlace transform operator. The resultant signal, as limited in the positive direction by a limit block 460 defines the flare control valve signal FCV.

E. SUMMARY OF OPERATION (1) Turbine Lead Mode of Operation

Startup of the integrated coal gasification combined cycle power plant 14 can be initiated by first starting the combined cycle power plant 14. Startup of the combined cycle power plant 14 commences with the starting of the gas turbine 26 and electric generator 38. The gas turbine 26 follows a normal start sequence consisting of crank, ignition, warmup and acceleration to 100% rated speed. During the gas turbine startup sequence, the liquid fuel flow to the gas turbine 26 is regulated by the startup control circuit 230. When the gas turbine reaches 100% rated speed, the phase and speed of the electric generator 38 are synchronized with the grid and the electrical breaker 40 is closed connecting the generator to the grid. The gas turbine 26 is then loaded to a part load condition using distillate fuel by manually raising the digital set point DSP using the digital set point circuit 238 contained in the gas turbine plant controller 22.

With the gas turbine operating at part load, the steam cycle equipment is next brought into operation. The controls for this equipment are not part of this invention and may be of the standard commercially available design. By way of brief description, however, the necessary steam cycle auxiliary equipment is first brought into service and the heat recovery steam generator (HRSG) 42 warmed and pressurized. When steam turbine generator 27 and rotor are sufficiently warmed and sufficient steam generation is available from the HRSG 42, the steam turbine generator 27 is started. The steam turbine generator 27 proceeds through a normal start cycle consisting of acceleration, hold, acceleration, generator, synchronization and steam turbine loading. When the HRSG isolation damper (not shown) is full open and the bypass damper (not shown) full closed, the first phase of the steam cycle loading sequence is complete. The power output of the steam turbine generator 27 then varies as a function of the available exhaust heat from the gas turbine 26.

When the gas turbine 26 is operating at part load and steam is available from the HRSG 42, startup of the coal gasification plant of the type illustrated in FIG. 1 (i.e. fixed bed-air blown gasifier) can be initiated. Startup of coal gasification plant 12 may commence with the starting of the booster compressor 46 and steam turbine driver 44. The extraction air control valve 50 is first opened and the air header 52 and booster compressor 46 are pressurized with extraction air from gas turbine compressor 48. The booster compressor 46 and steam turbine driver 44 are then accelerated to speed and the extraction air is pressurized to the pressure required to operate the coal gasifier 16. When steam, air and coal are available to operate the coal gasifier 16 of this example, startup of the coal gasifier 16 can be initiated. During startup, the coal gasifier 16 will be initially controlled using the gasifier feed control, circuit 336 (FIG. 3) which will incorporate the specific startup control features required by the type of gasifier being used. Prior to starting the coal gasifier 16, the necessary auxiliary equipment in the clean-up system 20 will have been brought into service and the selective pieces of equipment brought up to operating temperature as required. Coal gasifier 16 will then be brought to a nominal operating condition of pressure and flow and the raw gas diverted to the plant flare 25 for combustion. When the coal gasifier 16 reaches a satisfactory initial operating condition and the gas clean-up system 20 is ready to accept raw gas, control of the coal gas production rate will be transferred to coal gas fuel flow set point control circuit 330. Coal gas flow will then slowly be diverted by the gasifier controls (not shown) to the gas clean-up system 20 to effect a controlled loading and pressurization. The pressure in the gas supply header 24 and clean-up system 20 will be increased slowly by raising the set point SP3 of the flare pressure control circuit 342 to the nominal plant design point. Concurrently the coal gas production rate will also be increased to the first hold point by increasing the set point GFS of the gas fuel flow set point control circuit 330. When this procedure is completed, both the combined cycle power plant 14 and the coal gasification plant 12 will be up and running and the combined cycle power plant 14 will be generating power using distillate fuel. As known in the art, the relative sequencing of combined cycle and coal gasification plant equipment will be dependent upon the type of coal gasifier 16 being utilized.

When the gas clean-up system 20 is stabilized and the quality of clean coal gas generated is verified as suitable for combustion in gas turbine 26 transfer to DUAL FUEL, operation may be initiated by the operator by placing switch SW1 of manual control circuit 23 into position two. This causes the DUAL FUEL signal to be established at the binary "1" level. The DUAL FUEL signal is applied to OR gate 126 of the gas stop valve control circuit 90 and if all the protective permissives are satisfied, causes the gas stop valve 28 to be opened.

This results in the application of pressure to the upstream side of gas control valve 30. See FIG. 1. The pressure signal P1 applied to the gas availability signal generator 104 (FIG. 7) will be at a value greater than the pressure set point signal SP2 since it will be at the flare set point SP3 which is usually set at a higher level than set point SP2. This causes the gas availability signal GASA to take on a large positive value indicating the availability of gas fuel. This signal is applied to the fuel rate control circuit 84 (FIG. 6), where it is compared to the gas request signal GASR in the low value select circuit 174. Initially GASA>GASR and GASR limits the gas fuel signal GFC to the gas control valve 30.

Since switch SW1 is in position two, the ALL LIQUID signal is at a binary "0" level and is applied, along with the output (AUTL) of the gas disable circuit 86, to the OR gate 154 located in the fuel transfer signal generator 96 (FIG. 5). When all the permissives of the gas disable circuit 86 are satisfied, the output of OR gate 154 (the transfer to liquid signal TRLC) changes to a binary "0" which is a permissive for dual fuel operation.

The signal TRLC is applied to the fuel rate control circuit 84 (FIG. 6). When TRLC becomes a binary "0", the transfer timer signal TT decays at a controlled rate and slowly removes the gas fuel flow shutoff bias being applied to adder 170. This results in the gas fuel flow increasing at a controlled rate until it reaches the lesser of the GASR or GASA signals. As the gas fuel flow is increased, the liquid fuel flow signal LFC is correspondingly decreased, reducing the liquid fuel flow to the turbine until the minimum liquid fuel flow set point is reached. Concurrently, the total fuel command signal generator 156 regulates the total fuel command signal TFC, and hence the liquid fuel command LFC and gas fuel command GFC, in a manner to regulate the power output of the gas turbine at the level set by the digital set point DSP.

As the flow of gas fuel to the gas turbine 26 is gradually increased, a gas fuel rate is reached (by design) where the gas consumption of the gas turbine 26 exceeds the gas production rate of the coal gasifier 16 set by the gas fuel flow set point signal generator 426. When this occurs, the pressure in the gas supply header 24 begins to decay below the flare pressure control set point SP3 and the flow of gas to the plant flare 25 is shut off. The gas supply header pressure P1 continues to decay until the header pressure approaches to within a predetermined error band of the pressure set point SP1 of the plant pressure control circuit 328. At this time, control of gasifier flow is automatically transferred from the coal gas fuel flow set point control circuit 330 to plant pressure control circuit 328. Plant pressure control circuit 328 then acts to increase the gas demand signal GFD and thus the gas production rate of coal gasifier 16 to maintain the gas supply header pressure P1 at the set point SP1. In the event that during this transfer the gas supply header pressure P1 transiently falls below pressure setpoint SP1 and approaches setpoint SP2 of the gas availability signal generator 104, the gas availability signal generator 104 gradually reduces the gas availability signal GASA. When GASA drops below the gas request signal GASR, the flow of gas fuel to the gas turbine 26 is limited by GASA and the liquid fuel flow is transiently increased from the minimum level to maintain the power output of the gas turbine 26 constant.

It is to be noted that for the pressure P1 in gas supply header 24 to decay from the set point SP3 (flare control) to set point SP1 (plant pressure control) the gas production rate as established by the coal gas fuel flow set point control circuit 330 must be set by the operator below the gas request GASR associated with the specific gas turbine load set point DSP and above the minimum gas flow level acceptable for satisfactory combustor operation as established by the minimum gas availability signal MGA.

When control of the gas supply header 24 has been transferred to the plant pressure control circuit 328 and the gas fuel production rate stabilized at a steady state value, transfer to the dual fuel mode of operation is completed. This occurs a period of time after the plant pressure control circuit 328 has been activated and is a precondition for transfer to all gas operation. At this time, the liquid fuel flow will normally be at the minimum liquid fuel flow level.

Having completed a transfer to dual fuel operation, the operator may initiate a transfer to all gas operation by placing switch SW1 in position three causing the ALL GAS signal to take a binary "1" value and the DUAL FUEL and ALL LIQUID signals to take a binary "0" value. The ALL GAS signal is applied to the all gas enable circuit 88 (FIG. 5). If the plant pressure control signal PPC has been enabled for a sufficient period of time to permit steady state gas flow conditions to be achieved, as determined by time delay circuit 134, and the electric generator 38 power output signal MW is above a minimum set point MMW, a transfer to gas signal TRGC will be generated at the output of fuel transfer signal generator 96. This is applied to fuel rate control circuit 84 (FIG. 6) causing the liquid fuel command signal LFC to be reduced at a controlled rate thereby shutting off the flow of liquid fuel flow to the gas turbine 26. The liquid fuel flow signal LFC is reduced by the liquid lockout signal operating through the low value select circuit 180. Also the transfer timer signal TT biases out minimum liquid fuel offset K3 applied to adder 194 which forms the gas request signal GASR.

Under normal operating conditions, when the plant pressure control circuit 328 is regulating the gas supply header 24 pressure P1 at the setpoint SP1, the gas request signal GASR will be less than the gas availability signal GASA and the gas fuel flow to gas turbine 26 will be regulated by the gas request signal GASR. As the flow of liquid fuel flow is gradually reduced the total fuel command signal generator 156 acts to increase the gas request signal GASR and thus the flow of as fuel to the gas turbine 26.

When the transfer to all gas operation is completed, the operator may then increase or decrease the power output of the combined cycle power plant 14 by raising or lowering the digital set point DSP in the digital set point circuit 238. The plant pressure control circuit 328 automatically increases or decreases the gas production rate of coal gasifier 16 while regulating the pressure in gas supply header 24. In the event of an increase or decrease in grid frequency, the total fuel command signal generator 156 automatically adjusts the power output of the gas turbine 26 in a manner to attempt to hold frequency constant.

While the steam turbine control is not specifically described, the power output of the steam turbine generator 27 will be determined by the amount of steam generated in the heat recovery steam generator 42 which is a function of the sensible heat available in the gas turbine exhaust gas. Therefore, as the gas turbine power output is increased, the exhaust temperature and/or flow is increased and the power output of the steam turbine generator 27 is also increased. Thus, in general, the power output of the steam turbine generator 27 increases and decreases with the power output of the gas turbine 26.

(2) Turbine Follow Mode of Operation

Having described start-up in the turbine lead mode, start-up in the turbine follow mode is essentially identical up through part load operation of the combined cycle power plant 14 on distillate fuel. At this time coal gas production is established at the preset level determined by gas fuel flow set point control circuit 330 (FIG. 14).

Similarly, when the gas clean-up system 20 is stabilized and the quality of clean coal gas generated is verified as suitable for combustion in gas turbine 26, transfer to dual fuel may be initiated by the operator by placing switch SW1 of fuel mode select circuit 56 into position two. This causes the DUAL FUEL signal to be established at the binary "1" level. The signal is applied to the gas stop valve control circuit 90 and if all the protective permissives are satisfied causes the gas stop valve 28 to be opened.

As a result of this action, pressure is applied to the upstream side of gas control valve 30. The header pressure signal P1 is applied to the gas availability signal generator 104 (FIG. 7) and will be at a value greater than the pressure set point signal SP2 since set point SP3 is generally set at a higher level than set point SP2. This causes the gas availability signal GASA to take on a large positive value indicating the availability of gas fuel. The gas availability signal GASA is applied to the fuel rate control circuit 84 (FIG. 6), where it is compared to the gas request signal GASR in the low value select circuit 174. Initially GASA is greater than GASR and GASR limits the gas fuel signal GFC to the gas control valve 30.

Since switch SW1 is in position two, the ALL LIQUID signal is at the binary "0" level. This signal along with the output from the gas disable circuit 86 is applied to the OR gate 154 located in the fuel transfer signal generator 96 (FIG. 5). The output of OR gate 154 forms the transfer to liquid fuel signal TRLC. When all the permissives of the gas disable circuit 86 are satisfied, the transfer to liquid signal TRLC changes to a binary "0" level which is a permissive for dual fuel operation.

The transfer to liquid fuel signal TRLC is applied to the fuel rate control circuit 84 (FIG. 6). When TRLC falls to the binary "0" level, the transfer timer signal TT decays at a controlled rate and slowly removes the gas fuel flow shutoff bias being applied to adder 170. This results in the gas fuel flow increasing at a controlled rate until it reaches the lesser of the GASR or GASA signals. As the gas fuel flow is increased, the liquid fuel flow signal LFC is correspondingly decreased, reducing the liquid fuel flow to the gas turbine 26 until the minimum liquid fuel flow set point is reached. Concurrently, the total fuel command signal generator 156 (FIG. 9) regulates the total fuel command signal TFC, and thereby regulates the liquid fuel command signal LFC and gas fuel command signal GFC (FIG. 6), in a manner which regulates the power output of the gas turbine 26 to the level set by the digital set point DSP.

As the gas fuel flow to the gas turbine 26 is gradually increased, a gas fuel rate will be reached (by design) where the gas consumption of the gas turbine 26 exceeds the gas production rate of the coal gasifier 16 set by the gas fuel flow set point control circuit 330 (FIG. 14). When this occurs, the pressure P1 in the gas supply header 24 begins to decay below the flare pressure control set point SP3 and the flow of gas to the plant flare 25 is shut off. The gas supply header pressure P1 continues to decay until the pressure P1 of gas supply header 24 approaches the pressure set point SP2 of the gas availability signal generator 104 (FIG. 7). If the integral turbine follow mode has been selected (i.e. switch SW2 in position 3) then the gas supply pressure P1 decays exactly to the pressure set point SP2 of the gas availability signal generator 104 and the steady state gas fuel flow to gas turbine 26 will equal the gas production rate of coal gasifier 16.

It is important to note that the integral turbine follow mode is possible only when one gas turbine 26 is regulating the pressure in gas supply header 24. When more than one gas turbine is operating from the gas supply header in a turbine follow mode, then the proportional turbine follow mode must be used (i.e. switch SW2 must be placed in position two). In this case the pressure P1 in the gas supply header 24 decays to a pressure above the pressure set point SP2 of the gas availability signal generator 104 (FIG. 7), the pressure error signal E6 will be a function of the pressure droop characteristic of the gas availability signal generator 104 as established by gain constant K14 and the characteristics of the gas control valve 30. As the pressure P1 in the gas supply header 24 decays, the pressure error signal E6 and the gas availability signal GASA diminish. When the gas availability signal GASA drops below the gas request signal GASR, it reduces the flow of gas fuel to the turbine 26 (FIG. 6). Concurrently with this action, the total fuel command circuit signal generator 156 (FIG. 9) operating in conjunction with the fuel rate control circuit 84 (FIG. 6) acts to increase the liquid fuel flow to the gas turbine 26 to maintain the desired power output as established by the set point DSP.

It is to be noted that for the pressure in gas supply header 24 to decay from the flare control pressure set point SP3 to the pressure set point SP2, the gas production rate as established by the gas fuel flow set point control circuit 330 (FIG. 14) must be set by the operator below the gas request GASR associated with the specific gas turbine load set point DSP and above the minimum gas flow level acceptable for satisfactory combustor operation as established by the minimum gas availability signal MGA.

When control of the gas supply header 24 has been transferred to the gas availability signal generator 104 and the pressure in gas supply header 24 has been stabilized at a steady state value, transfer to the dual fuel mode of operation is completed. This occurs a period of time after the gas availability signal GASA drops below the total fuel command signal TFC and is a precondition for transfer to all gas operation.

Having completed a transfer to dual fuel operation, the operator may initiate a transfer to all gas operation by placing switch SW1 in position three causing the ALL GAS signal to take a binary "1" value and the DUAL FUEL and ALL LIQUID signals to take a binary "0" value. The ALL GAS signal is applied to the all gas enable circuit 88 (FIG. 5). If the gas availability signal GASA has been below the total fuel command signal for a sufficient period of time to permit steady state gas flow conditions to be achieved (as determined by time delay circuit 134), and the electric generator 38 power output signal MW is above a minimum set point MMW, a transfer to gas signal TRGC is generated at the output of fuel transfer signal generator 96. This signal is applied to fuel rate control circuit 84 (FIG. 6) causing the liquid fuel command signal LFC to be reduced at a controlled rate thereby shutting off the liquid fuel flow to the gas turbine 26. The liquid fuel flow signal LFC is reduced by the liquid lockout circuit 182 operating through the low value select 180. Also the transfer timer signal TT biases out minimum liquid fuel offset K3 applied to adder 194 which forms the gas request signal GASR.

The transfer to gas signal TRGC is also applied to the plant load control circuit 326 (FIG. 12). When the TRGC signal is at the binary "1" level, indicating that the all gas mode has been selected, and the inverted turbine lead signal $\overline{TL}$ is at the binary "1" level, indicating that the turbine lead mode has not been selected, control of the gas turbine power output is transferred to the plant load control circuit 326 (FIG. 12). As the flow of liquid fuel flow is gradually reduced tending to cause a reduction in the gas turbine 26 power output, the plant load control circuit 326 begins to generate on error signal E16 which is applied to integration block 380 causing an increase in the gas fuel demand signal GFD and thus a gradual increase in the gas production rate of coal gasifier 16. Following the increase in gas production of coal gasifier 16, an increase in the gas supply header pressure is sensed by the gas availability signal generator 104 (FIG. 7) which automatically acts to increase the gas consumption rate of gas turbine 26. Thus, during a transfer to the all gas mode of operation, the plant load control circuit 326 operates to maintain the power output of gas turbine 26 essentially constant and the gas availability signal generator 104 regulates the pressure P1 in the gas supply header 24 at or slightly above the level of pressure set point SP2.

It is also to be noted that upon transfer to all gas (TRGC=1), the total fuel command signal tracking circuit 268 (FIG. 9), the DSP tracking circuit 252 (FIG. 9), and the gas fuel flow set point control circuit 330 (FIG. 14) are enabled. These circuits operate to cause the total fuel command signal TFC to track the gas availability signal GASA, the digital set point signal DSP to track the electric generator 38 power output signal, and the gas fuel signal GFS to track the gas fuel demand signal GFD, respectively. The objective of these circuits is to prevent dual fuel power the plant 10 from being subject to a severe transient in the event of an automatic transfer to the dual fuel or all liquid mode of operation.

It is also to be noted that prior to the transfer to all gas operation, the fuel demand tracking circuit 350 in the plant load control circuit 326 (FIG. 12) will have been enabled. This circuit operates to cause the power set point PSP to track the power output MW of electric generator 38 and cause the gas turbine power signal GTP from the plant load control circuit 326 to track the gas fuel demand signal GFD. The objective of this circuit is also to prevent the plant 10 from being subject to a severe transient when load control is transferred from the gas turbine plant controller 22 to the plant load control circuit 326 in the coal gas plant controller 18.

When the transfer to all gas operation is completed, the operator may then increase or decrease the power output of the combined cycle plant 14 by raising or lowering the power set point PSP in the plant load control circuit 326. The plant load control circuit 326 automatically increases or decreases the gas production rate of coal gasifier 16 while the gas availability signal generator 104 regulates the pressure P1 in gas supply header 24, thereby increasing or decreasing the power output of gas turbine 26. In the event of an increase or decrease in grid frequency, the plant load control circuit 326 automatically adjusts the coal gas production rate and hence the power output of the gas turbine 26 in a manner to attempt to hold frequency constant.

While the steam turbine control is not specifically described, the power output of the steam turbine power generator 27 will be determined by the amount of steam generated in the heat recovery steam generator 42 which is a function of the sensible heat available in the gas turbine 26 exhaust gas. Therefore, as the gas turbine 26 power output increased, the exhaust temperature and/or flow is increased and the power output of the steam turbine power generator 27 will also increase. Thus, in general, the power output of steam turbine power generator 27 tracks that of the gas turbine 26.

In the foregoing discussions regarding turbine lead and turbine follow modes of operation, switch SW1 is manually switched between positions two and three. However, switch SW1 could be initially placed in position three and the sequencing from all liquid to all gas can progress automatically if all the permissives are satisfied.

The following table is an operational summary of the various active controllers which regulate gas supply header pressure, coal gasifier flow and electric generator output in the ALL LIQUID, DUAL FUEL and ALL GAS modes of operation for both turbine lead and turbine follow:

| OPERATIONAL SUMMARY | | | |
|---|---|---|---|
| | All Liquid Fuel | Dual Fuel | All Gas |
| Turbine Follow Mode | | | |
| Gas Supply Header 24 Press. Control | Flare Pressure Control Circuit 342 | Gas Availability Signal Generator 104 | Gas Availability Signal Generator 104 |
| Coal Gasifier 16 Flow Control | Gas Fuel Flow Set Point Control Circuit 330 | Gas Fuel Flow Set Point Control Circuit 330 | Plant Load Control Circuit 326 |
| Electric Generator 38 Power Output | Total Fuel Command Signal Generator 156 | Total Fuel Command Signal Generator 156 | Control Circuit 326 |
| Turbine Lead | | | |
| Gas Supply Header 24 Press. Control | Flare Pressure Control Circuit 342 | Plant Pressure Control Circuit 328 | Plant Pressure Control Circuit 328 |
| Coal Gasifier 16 Flow Control | Gas Fuel Flow Set Point Control Circuit 330 | Plant Pressure Control Circuit 328 | Plant Pressure Control Circuit 328 |
| Electric Generator 38 Power Output | Total Fuel Command Signal Generator 156 | Total Fuel Command Signal Generator 156 | Total Fuel Command Signal Generator 156 |

The present invention may be embodied in other specific forms without departing from the spirit or essential attributes thereof and, accordingly, reference should be made to the appended claims, rather than to the foregoing specification as indicating the scope of the invention.

What is claimed is:

1. A power plant, comprising:
   a coal gasification plant;
   said coal gasification plant being effective to produce a gas pressure of coal gas;
   a gas turbine effective to burn at least said coal gas and to produce an output power in response thereto;
   a coal gas plant controller responsive to a selectable one of said gas pressure and said output power for controlling feed of materials to said coal gasification plant, said coal gasification plant producing said gas pressure in response to said feed of materials; and
   a gas turbine plant controller responsive to the other of said gas pressure and said output power for controlling feed of at least said coal gas to said gas turbine.

2. A power plant according to claim 1 wherein said coal gas plant controller is responsive to said gas pressure and said gas turbine plant controller includes means for feeding an amount of a liquid fuel to said gas turbine sufficient, in combination with said coal gas, for maintaining said output power at a predetermined value.

3. A power plant according to claim 2 wherein said means for feeding an amount of a liquid fuel includes means for maintaining said gas pressure at a predetermined value.

4. A power plant according to claim 2 wherein said means for feeding an amount of a liquid fuel includes means for feeding sufficient liquid fuel to produce said output power.

5. A power plant according to claim 1 wherein said coal gas plant controller is responsive to said output power, said gas turbine plant controller includes means for feeding only said coal gas to said gas turbine, and said gas turbine plant controller includes means for limiting said means for feeding to feed only said coal gas at a rate equal to a lower of an amount of coal gas available and an amount of coal gas required to produce said output power.

6. A power plant according to claim 5 wherein said gas turbine plant controller includes means for calculating said amount of coal gas available responsive to a difference between said gas pressure and a desired gas pressure, and said means for calculating selectably includes means for integrally calculating said amount and means for proportionately calculating said amount.

7. A power plant according to claim 1 wherein said materials include at least steam and compressed air.

8. A power plant according to claim 7 wherein said gas turbine includes means for generating said steam and compressed air.

9. A power plant according to claim 8 wherein said means for generating said steam includes a heat recovery steam generator.

10. A power plant according to claim 1 further comprising means for generating a power set point.

11. A power plant according to claim 10 wherein said gas turbine plant controller includes means for comparing said power set point with said output power to produce a fuel command for feeding fuel to said gas turbine.

12. A power plant according to claim 11 wherein said fuel command includes a total fuel command.

13. A power plant according to claim 12 wherein said gas turbine plant controller includes means for apportioning said total fuel command between a gas fuel command and a liquid fuel command.

14. A power plant according to claim 12 wherein said gas turbine plant controller includes means for modifying said total fuel command in response to a speed of said gas turbine to control said speed at a predetermined value.

15. A power plant according to claim 10 wherein said coal gas plant controller includes means for differencing a speed of said gas turbine and a predetermined speed, means for modifying said power set point in response to said difference to produce a gas fuel demand signal effective for controlling the feed of said materials to said coal gasification plant.

16. A power plant according to claim 15 wherein said predetermined speed is related to a frequency of a power grid and said gas fuel demand signal is effective for controlling said speed toward a speed which produces a predetermined power grid frequency.

17. A power plant according to claim 1 wherein:
said gas turbine plant controller includes means for feeding a liquid fuel to said gas turbine together with said coal gas in a quantity sufficient conjointly to produce said output power and to maintain a predetermined value of said gas pressure.

18. A power plant according to claim 17 wherein said coal gas plant controller includes means for feeding said materials at a rate effective for maintaining said gas pressure at a predetermined value.

19. A power plant according to claim 1 further comprising manual means for making said coal gas plant controller responsive to a manually selected one of said gas pressure and said output power.

20. A power plant according to claim 19 further comprising means for controlled transfer of said response in a manner effective to reduce transients on said gas turbine.

21. A power plant according to claim 20 wherein said means for controlled transfer includes a transfer timer, said transfer timer controlling smooth transfer of control over a predetermined time.

22. A power plant according to claim 1 wherein said gas turbine plant controller is effective for controlling a feed of said coal gas and a liquid fuel to said gas turbine and further includes means for cutting off said coal gas from said gas turbine in response to at least one parameter relating to said coal gas being outside predetermined respective limits.

23. A power plant according to claim 22 wherein said at least one parameter and respective limit includes at least one of the following:
a pressure of said coal gas less than a minimum;
a request for said coal gas less than a minimum;
a temperature of said coal gas exceeding a maximum;
a forward pressure drop in a feed of said coal gas to said gas turbine less than a minimum; and
a heating quality of said coal gas less than a minimum.

24. A power plant of the type including a coal gasification plant effective to produce a coal gas at a pressure, a gas clean-up system effective to clean contaminants from said coal gas to produce clean coal gas, at least one gas turbine effective to burn said clean coal gas and to drive a load at a predetermined output power, comprising:
a control system;
first means in said control system for controlling said coal gas plant in response to a selectable one of said pressure and said output power; and
second means in said control system for controlling said gas turbine in response to the other of said pressure and said output power.

25. A power plant according to claim 24 wherein said first means includes means for feeding at least one of coal, steam and compressed air to said coal gasification plant whereby said pressure is increased.

26. A power plant according to claim 24 wherein said second means includes means for feeding at least one of said clean coal gas and a liquid fuel to said gas turbine.

27. A power plant according to claim 26 wherein said means for feeding includes means for proportioning simultaneous flow of said clean coal gas and said liquid fuel to said gas turbine.

28. A power plant according to claim 27 wherein said means for feeding includes means for producing a power set point, means for differencing said power set point and said output power to produce a power error signal and means for adjusting said simultaneous flow in response to said power error signal whereby said output power is adjusted toward said power set point.

29. A power plant according to claim 24 wherein said first means include a plant pressure control circuit and a plant load control circuit, means for enabling said plant pressure control circuit for controlling said coal gasification plant when said selectable one is said pressure, means for enabling said plant load control circuit, for controlling said coal gasification plant when said selectable one is said output power, means in said plant pressure control circuit for tracking an output of said plant load circuit while said plant load control circuit is enabled and means in said plant load control circuit for tracking an output of said plant pressure control circuit when said plant pressure control circuit is enabled whereby bumpless transfer between said load control circuit and said pressure control circuit is obtained.

30. A power plant according to claim 29 wherein said first means further includes a gas flow set point control circuit, said gas flow set point control circuit including means for enabling said gas flow set point control circuit for controlling said coal gasification plant when neither said gas pressure control circuit nor said plant load control circuit is enabled, said gas flow set point control circuit including means for tracking an output of an enabled one of said plant pressure control circuit and said plant load control circuit and said plant pressure control circuit and said plant load control circuit including means for tracking an output of said gas flow set point control circuit when said gas flow set point control circuit is enabled whereby bumpless transfer between said load control circuit, said pressure control circuit and said gas flow set point control circuit is achieved.

31. A power plant according to claim 24 wherein said at least one gas turbine includes a plurality of selectively operable gas turbines and said control system includes means for proportional control of gas flow when more than one of said gas turbines is operable and further includes means for integral control of gas flow when a single one of said plurality of gas turbines is operable.

* * * * *